US010779295B2

(12) United States Patent
Lee et al.

(10) Patent No.: US 10,779,295 B2
(45) Date of Patent: Sep. 15, 2020

(54) TERMINAL OPERATION METHOD IN ACCORDANCE TO UPLINK SPS IN WIRELESS COMMUNICATION SYSTEM AND TERMINAL USING SAME

(71) Applicant: LG Electronics Inc., Seoul (KR)

(72) Inventors: Seungmin Lee, Seoul (KR); Hanbyul Seo, Seoul (KR); Myoungseob Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/090,547

(22) PCT Filed: Apr. 3, 2017

(86) PCT No.: PCT/KR2017/003656
§ 371 (c)(1),
(2) Date: Oct. 1, 2018

(87) PCT Pub. No.: WO2017/171525
PCT Pub. Date: Oct. 5, 2017

(65) Prior Publication Data
US 2019/0014564 A1   Jan. 10, 2019

Related U.S. Application Data

(60) Provisional application No. 62/403,677, filed on Oct. 3, 2016, provisional application No. 62/403,061, filed
(Continued)

(51) Int. Cl.
*H04W 72/10* (2009.01)
*H04W 72/04* (2009.01)
(Continued)

(52) U.S. Cl.
CPC .......... *H04W 72/10* (2013.01); *H04L 5/0042* (2013.01); *H04L 5/0053* (2013.01);
(Continued)

(58) Field of Classification Search
CPC .......... H04W 72/0493; H04W 72/042; H04W 72/121; H04W 72/1257; H04W 72/1294;
(Continued)

(56) References Cited

U.S. PATENT DOCUMENTS

2011/0039568 A1   2/2011   Zhang et al.
2013/0142142 A1   6/2013   McBeath et al.
(Continued)

FOREIGN PATENT DOCUMENTS

EP    2166804    3/2010
EP    3494743    6/2019
(Continued)

OTHER PUBLICATIONS

KR 10-2012-0074254 A (Electronics and Telecommunications Research Institute) Jul. 5, 2012 (Year: 2012).*
(Continued)

*Primary Examiner* — Rendentor Pasia
(74) *Attorney, Agent, or Firm* — Fish & Richardson P.C.

(57) ABSTRACT

Provided are an operation method in accordance with uplink semi-persistent scheduling (SPS) of a terminal in a wireless communication system and a terminal using the method. The method is characterized by: receiving, from a base station, downlink control information (DCI) for indicating activation or release of uplink SPS; and decoding the DCI on the basis of a first radio network temporary identifier (RNTI) or a second RNTI. If the DCI is a first DCI for SPS for transmitting a signal to the base station, the DCI is decoded on the basis of the first RNTI, and, if the DCI is a second DCI for SPS for transmitting a vehicle-to-everything (V2X)
(Continued)

signal, the DCI is decoded on the basis of the second RNTI. And the first RNTI and second RNTI are RNTIs that are different from each other.

15 Claims, 18 Drawing Sheets

Related U.S. Application Data on Oct. 1, 2016, provisional application No. 62/401,186, filed on Sep. 29, 2016, provisional application No. 62/376,376, filed on Aug. 17, 2016, provisional application No. 62/374,737, filed on Aug. 12, 2016, provisional application No. 62/335,658, filed on May 12, 2016, provisional application No. 62/333,778, filed on May 9, 2016, provisional application No. 62/320,332, filed on Apr. 8, 2016, provisional application No. 62/317,393, filed on Apr. 1, 2016.

(51) Int. Cl.
| | |
|---|---|
| *H04W 72/12* | (2009.01) |
| *H04W 76/14* | (2018.01) |
| *H04W 76/30* | (2018.01) |
| *H04W 74/04* | (2009.01) |
| *H04L 5/00* | (2006.01) |
| *H04W 4/40* | (2018.01) |
| *H04W 84/04* | (2009.01) |
| *H04W 88/06* | (2009.01) |

(52) U.S. Cl.
CPC ......... *H04L 5/0064* (2013.01); *H04L 5/0082* (2013.01); *H04L 5/0091* (2013.01); *H04W 4/40* (2018.02); *H04W 72/042* (2013.01); *H04W 72/044* (2013.01); *H04W 72/0406* (2013.01); *H04W 72/0493* (2013.01); *H04W 72/12* (2013.01); *H04W 72/121* (2013.01); *H04W 72/1257* (2013.01); *H04W 72/1294* (2013.01); *H04W 74/04* (2013.01); *H04W 76/14* (2018.02); *H04W 76/30* (2018.02); *H04W 84/04* (2013.01); *H04W 88/06* (2013.01)

(58) Field of Classification Search
CPC ..... H04W 72/12; H04W 76/30; H04W 76/14; H04W 74/04; H04L 5/0082; H04L 5/0064; H04L 5/0091; H04L 5/0053; H04L 5/0042

See application file for complete search history.

(56) References Cited

U.S. PATENT DOCUMENTS

| | | | |
|---|---|---|---|
| 2013/0182653 A1 | 7/2013 | Earnshaw et al. | |
| 2013/0223366 A1* | 8/2013 | Papasakellariou | H04W 72/042 370/329 |
| 2013/0322413 A1 | 12/2013 | Pelletier et al. | |
| 2014/0023000 A1* | 1/2014 | Joung | H04W 72/042 370/329 |
| 2014/0105164 A1* | 4/2014 | Moulsley | H04W 72/042 370/329 |
| 2014/0161069 A1 | 6/2014 | Ohta et al. | |
| 2014/0204888 A1* | 7/2014 | Chung | H04L 1/0061 370/329 |
| 2015/0063272 A1 | 3/2015 | Suzuki et al. | |
| 2015/0296490 A1 | 10/2015 | Yi et al. | |
| 2015/0334760 A1 | 11/2015 | Sartori et al. | |
| 2016/0278053 A1 | 9/2016 | Lee et al. | |
| 2016/0295624 A1* | 10/2016 | Novlan | H04W 76/14 |
| 2017/0019887 A1* | 1/2017 | Jiang | H04W 72/042 |
| 2017/0181155 A1 | 6/2017 | Chen et al. | |
| 2017/0188391 A1 | 6/2017 | Rajagopal et al. | |
| 2017/0201461 A1 | 7/2017 | Cheng et al. | |
| 2017/0289733 A1* | 10/2017 | Rajagopal | H04W 4/70 |
| 2017/0290030 A1* | 10/2017 | Wang | H04W 72/0446 |
| 2018/0048994 A1 | 2/2018 | Kwon et al. | |
| 2018/0049073 A1 | 2/2018 | Dinan et al. | |
| 2018/0049224 A1 | 2/2018 | Dinan et al. | |
| 2018/0049229 A1 | 2/2018 | Dinan et al. | |
| 2018/0160443 A1 | 6/2018 | Tang et al. | |
| 2018/0263052 A1* | 9/2018 | Xu | H04W 72/04 |
| 2018/0359747 A1* | 12/2018 | Yang | H04W 72/04 |
| 2019/0246407 A1* | 8/2019 | Lee | H04L 5/0082 |

FOREIGN PATENT DOCUMENTS

| | | | | |
|---|---|---|---|---|
| KR | 20120074254 A | * | 7/2012 | ............. H04L 5/006 |
| KR | 1020120074254 | | 7/2012 | |
| KR | 1020180017893 | | 2/2018 | |
| WO | WO2013191360 | | 12/2013 | |
| WO | WO-2013191360 A1 | * | 12/2013 | ........ H04W 72/1247 |
| WO | WO2015017983 | | 2/2015 | |
| WO | WO2015065061 | | 5/2015 | |
| WO | WO2018030775 | | 2/2018 | |
| WO | WO2018031473 | | 2/2018 | |

OTHER PUBLICATIONS

Panasonic, "Discussion on SPS mechanism supported in V2V," 3GPP TSG RAN WG1 Meeting #84, dated Feb. 15-19, 2016, 5 pages.
LG Electronics, "Summary of V2V offline summary," RAN WG1 Meeting #84, dated Feb. 15-19, 2016, 4 pages.
United States Office Action in U.S. Appl. No. 16/090,537, dated Apr. 1, 2019, 9 pages.
Huawei, HiSilicon, "Introduction of CB-PUSCH transmission," R2-156298, 3GPP TSG-RAN WG2 Meeting #92, Anaheim, USA, Nov. 16-20, 2015, 3 pages.
United States Office Action in U.S. Appl. No. 16/389,120, dated Jun. 13, 2019, 16 pages.
United States Office Action in U.S. Appl. No. 16/090,522, dated Dec. 2, 2019, 10 pages.
United States Office Action in U.S. Appl. No. 16/389,120, dated Dec. 10, 2019, 17 pages.
Extended European Search Report in European Application No. 17775949.5, dated Aug. 19, 2019, 6 pages.
Extended European Search Report in European Application No. 17775950.3, dated Aug. 21, 2019, 8 pages.
United States Office Action in U.S. Appl. No. 16/090,537, dated Oct. 15, 2019, 13 pages.
United States Final Office Action in U.S. Appl. No. 16/090,522, dated Jun. 12, 2020, 14 pages.

* cited by examiner

TERMINAL OPERATION METHOD IN ACCORDANCE TO UPLINK SPS IN WIRELESS COMMUNICATION SYSTEM AND TERMINAL USING SAME

CROSS-REFERENCE TO RELATED APPLICATIONS

This application is a National Stage application under 35 U.S.C. § 371 of International Application No. PCT/KR2017/003656, filed on Apr. 3, 2017, which claims the benefit of U.S. Provisional Applications No. 62/317,393 filed on Apr. 1, 2016, No. 62/320,332 filed on Apr. 8, 2016, No. 62/333,778 filed on May 9, 2016, No. 62/335,658 filed on May 12, 2016, No. 62/374,737 filed on August 12, 2016, No. 62/376,376 filed on Aug. 17, 2016, No. 62/401,186 filed on Sep. 29, 2016, No. 62/403,061 filed on Oct. 1, 2016, and No. 62/403,677 filed on Oct. 3, 2016, the contents of which are all hereby incorporated by reference herein in their entirety.

BACKGROUND OF THE INVENTION

Field of the Invention

The present invention relates to wireless communication and, most particularly, to a terminal operation method in accordance with uplink SPS in a wireless communication system and a terminal using the same.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

The above-described D2D communication may be expanded and applied to signal transmission and/or reception between vehicles. Most particularly, vehicle-related communication is referred to as vehicle-to-everything (V2X) communication.

In V2X, the term 'X' may refer to a pedestrian, a vehicle, an infrastructure/network, and so on, which may be respectively indicated as V2P, V2V, and V21/N.

Meanwhile, a wireless communication system may transmit signals by using semi-persistent scheduling (SPS). Herein, semi-persistent scheduling (SPS) corresponds to a scheduling method that first determines in advance a cycle period for transmitting a signal through a higher layer signal and then transmits a signal by using a modulation and coding scheme (MCS), a resource, and so on, which are indicated by a control channel according to the pre-determined cycle period, while directing (or instructing) activation of SPS through the control channel when announcing (or notifying) a specific resource.

The signal transmission according to the above-described SPS may also be used in the V2X communication However, since the V2X communication has a characteristic that is different from the general uplink (UL) communication, it is not preferable to directly apply the SPS method, which was applied to the related art uplink communication, without any modification. In case of applying the SPS to the V2X communication, the method according to which the SPS is to be performed needs to be defined and regulated.

SUMMARY OF THE INVENTION

An object that is to be achieved by the present invention is to provide a terminal operation method in accordance with an uplink SPS in a wireless communication system and a terminal using the same.

In one aspect, provided is an operation method of a user equipment (UE) according to semi-persistent scheduling (SPS) in a wireless communication system. The method includes receiving downlink control information (DCI) instructing activation or release of uplink SPS from a base station and decoding the DCI based on a first radio network temporary identifier (RNTI) or a second RNTI.

In case the DCI corresponds to a first DCI of SPS for transmitting a signal to the base station, the DCI is decoded based on the first RNTI. In case the DCI corresponds to a second DCI of SPS for transmitting a vehicle-to-everything (V2X) signal, the DCI is decoded based on the second RNTI. And the first RNTI and the second RNTI correspond to different RNTIs.

The UE may correspond to a UE installed in a vehicle.

The first DCI and the second DCI may be received through a physical downlink control channel (PDCCH) or enhanced PDCCH (EPDCCH).

The first DCI and the second DCI may have the same bit size.

The first DCI may include a demodulation-reference signal (DM-RS) cyclic shift field, and the DM-RS cyclic shift field may announce information on a cyclic shift value of a DM-RS.

The second DCI may use the DM-RS cyclic shift field for a purpose of announcing an index of an uplink SPS configuration.

In another aspect, provided is a user equipment (UE). The UE includes a radio frequency (RF) unit transmitting and receiving radio signals and a processor being operatively connected to the RF unit. The processor is configured to receive downlink control information (DCI) instructing activation or release of uplink SPS from a base station, and to decode the DCI based on a first radio network temporary identifier (RNTI) or a second RNTI. In case the DCI corresponds to a first DCI of SPS for transmitting a signal to the base station, the DCI is decoded based on the first RNTI. In case the DCI corresponds to a second DCI of SPS for transmitting a vehicle-to-everything (V2X) signal, the DCI is decoded based on the second RNTI, and the first RNTI and the second RNTI correspond to different RNTIs.

A DCI having the same bit size as the existing uplink SPS activation/release DCI may be used. However, in this case, a DCI activation/release a V2X uplink SPS is provided by varying the RNTI. Accordingly, an excessive increase in the number of blind decoding that should be performed by the terminal (or user equipment (UE)) may be prevented. Additionally, the V2X uplink SPS activation/release DCI may use a DM-RS cyclic shift field may be used as a field for instructing a specific configuration among a plurality of V2X uplink SPS configurations.

DESCRIPTION OF EXEMPLARY EMBODIMENTS

Figure 1:
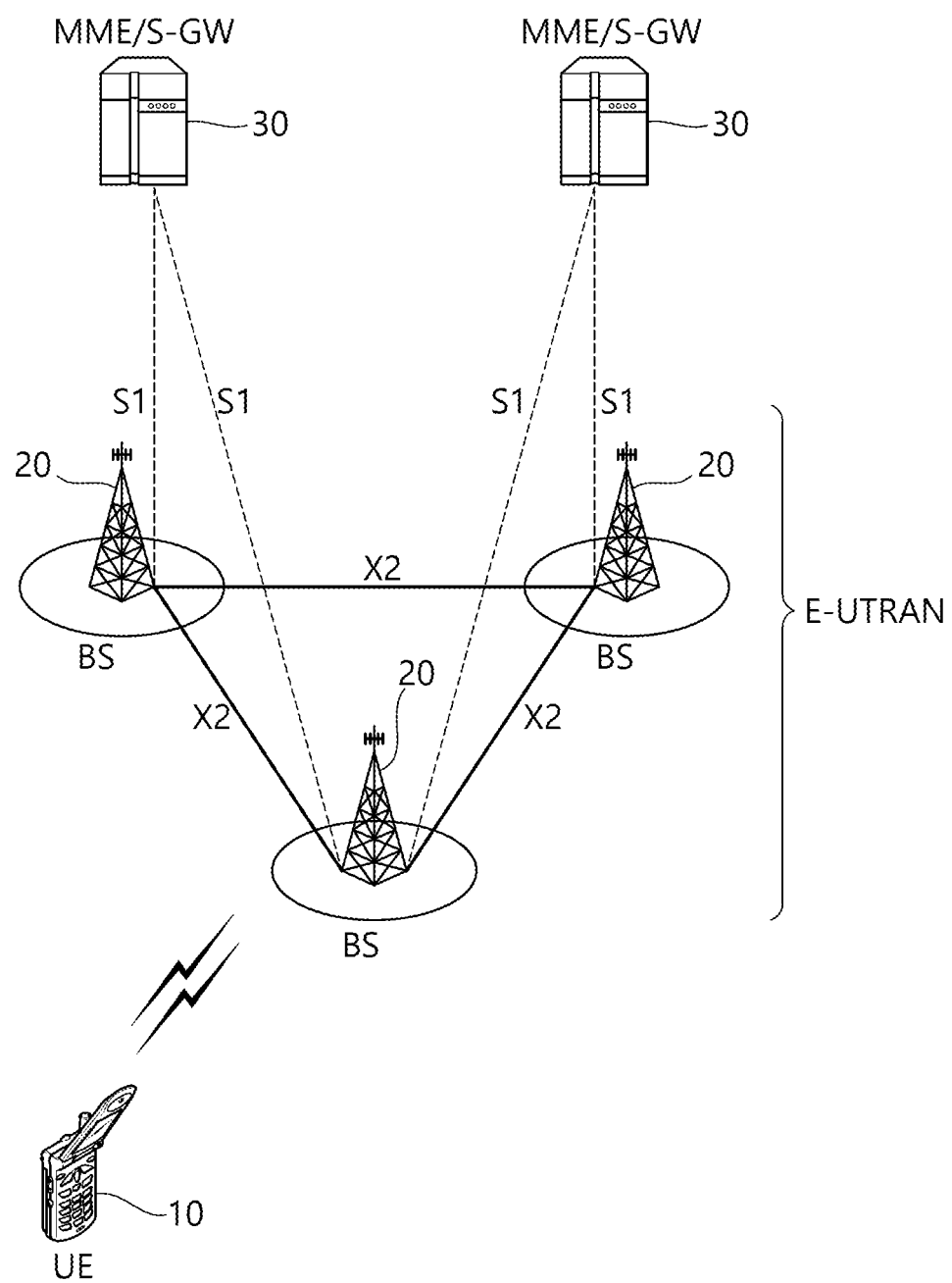
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
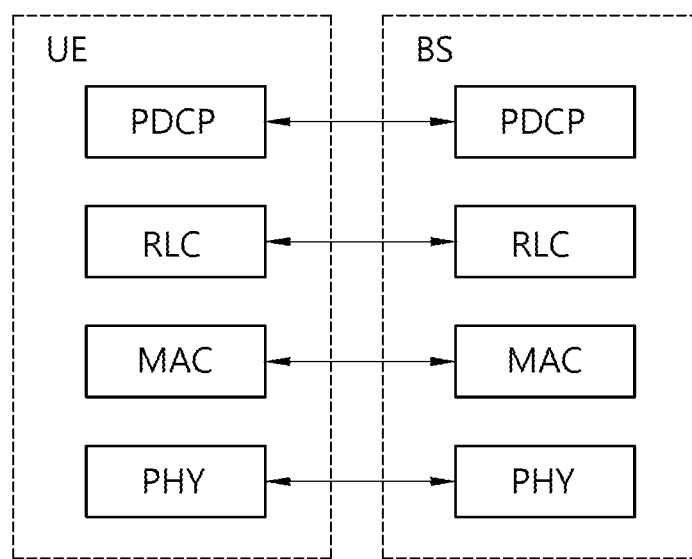
FIG. 2 is a diagram showing a wireless protocol architecture for a user plane.
Figure 3:
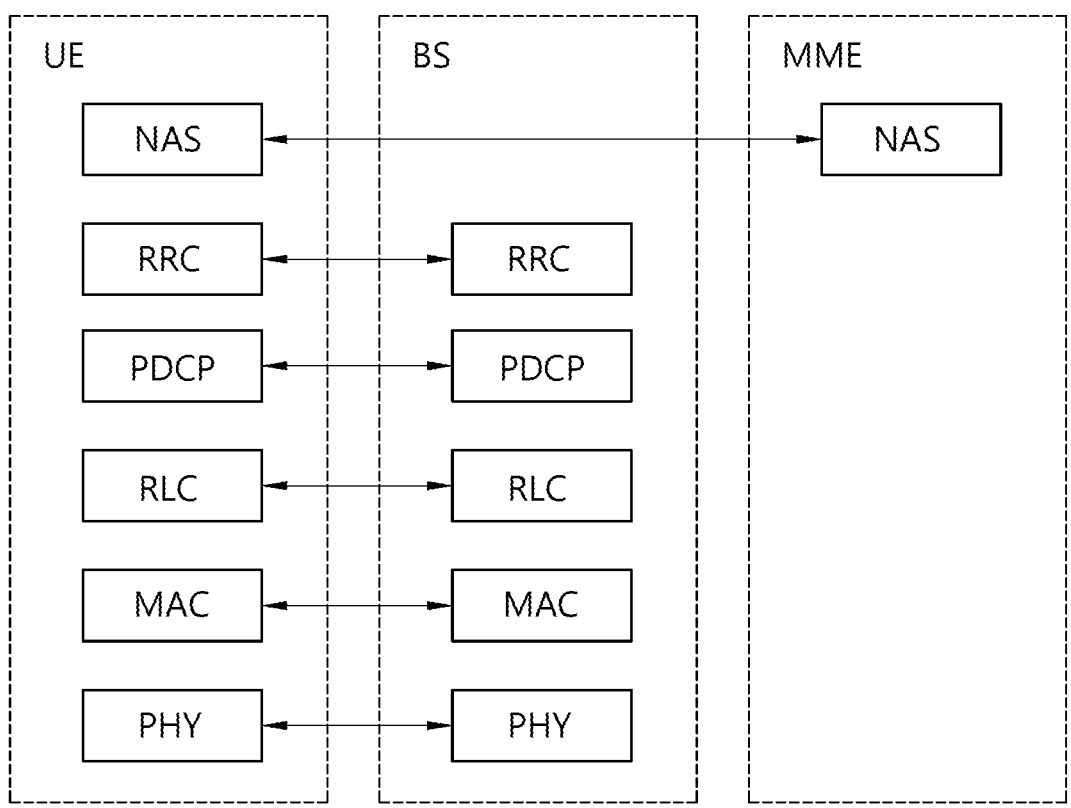
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
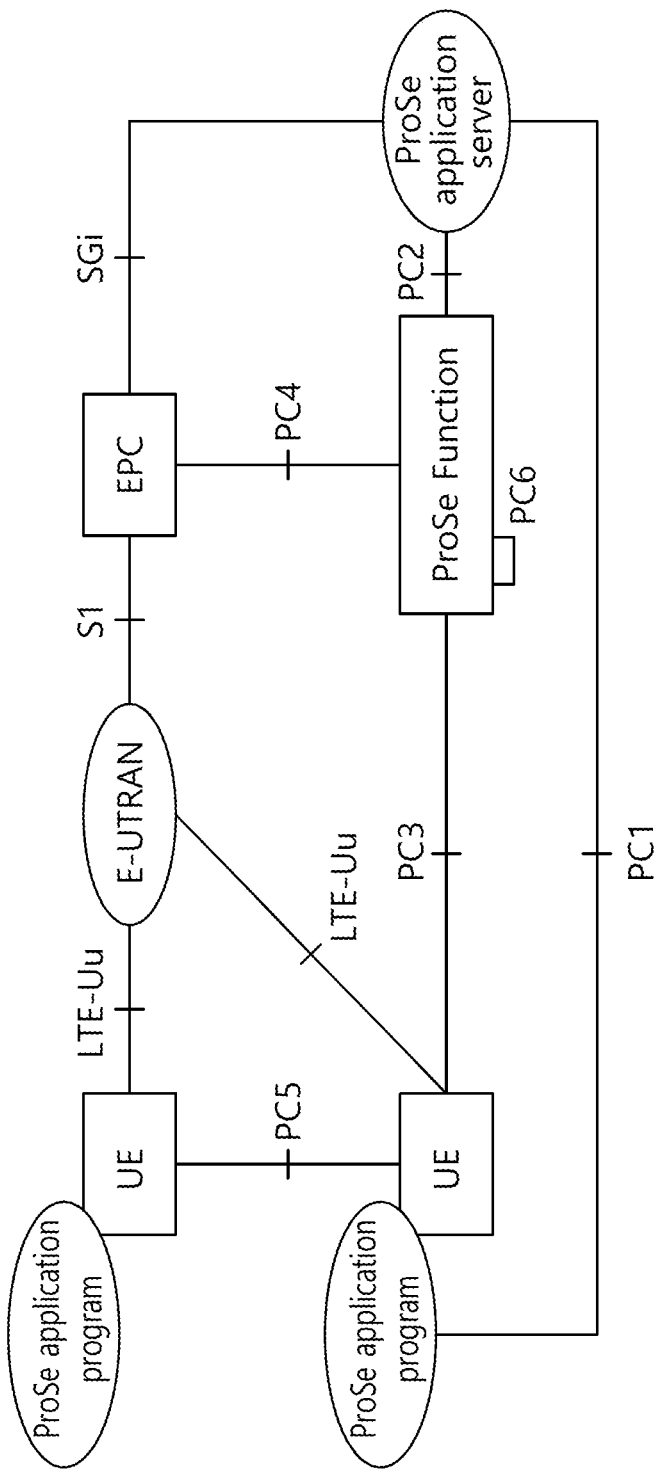
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
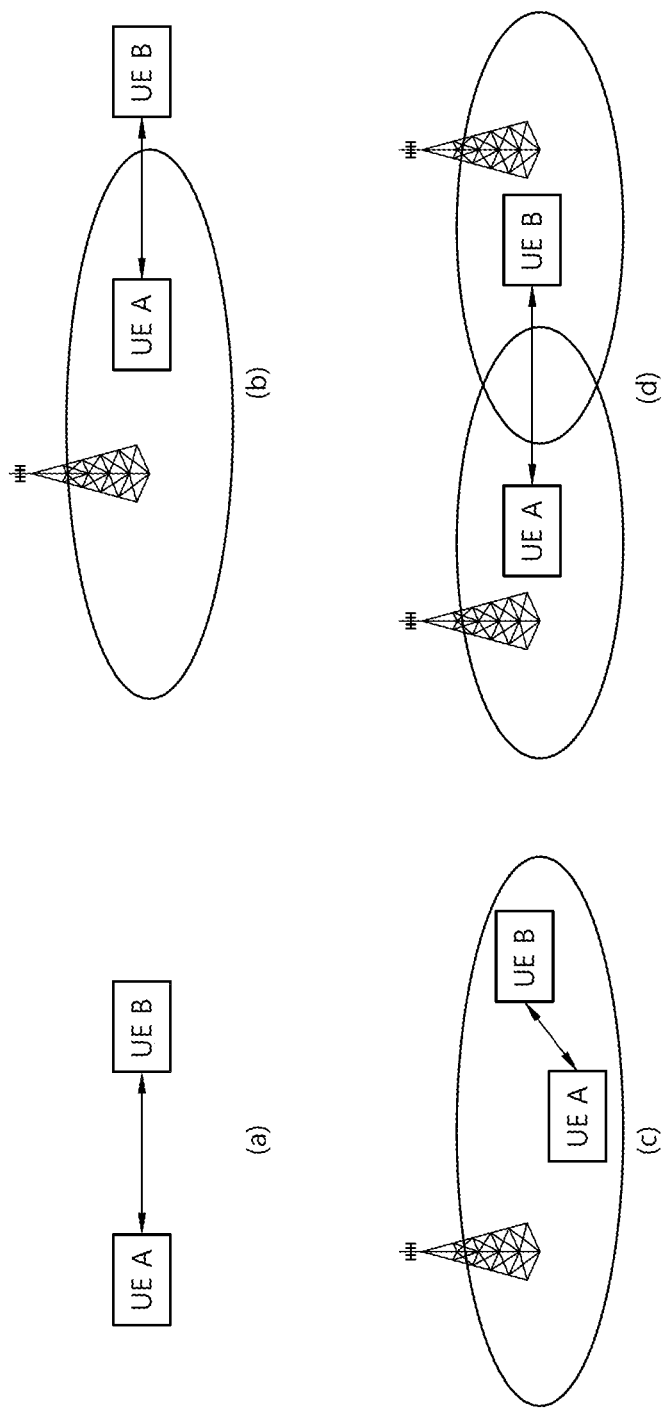
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell. ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

A PC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 6:
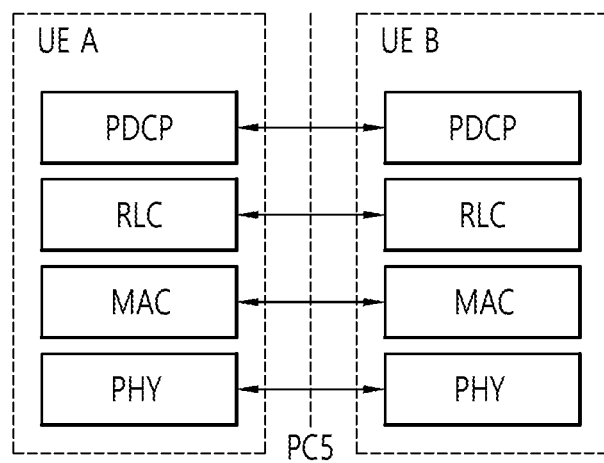
FIG. 6 shows a user plane protocol stack for ProSe direct communication.

FIG. 6 illustrates a user-plane protocol stack for the ProSe direction communication.

Referring to FIG. 6, the PC 5 interface is configured of PDCH, RLC, MAC, and PHY layers.

In the ProSe direct communication, there may be no HARQ feedback. A MAC header may include a Source Layer-2 ID and a Target Layer-2 ID.

Figure 7:
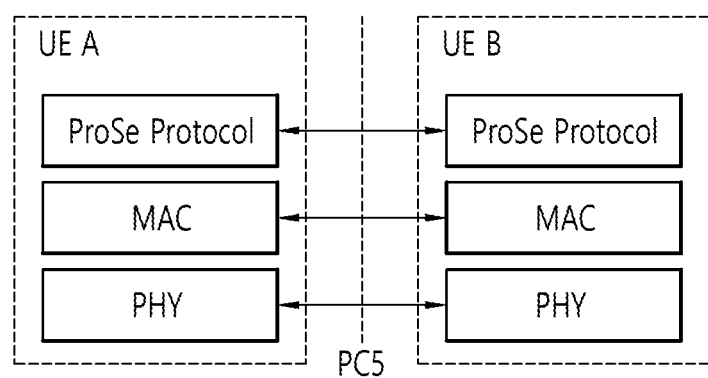
FIG. 7 shows a PC 5 interface for D2D discovery.

FIG. 7 illustrates a PC 5 interface for D2D discovery.

Referring to FIG. 7, the PC 5 interface is configured of a MAC layer, a PHY layer, and a ProSe Protocol layer, which corresponds to a higher-level layer. The higher-level layer (ProSe Protocol) is in charge of authorizing announcement (or notification) and monitoring of discovery information, and content of the discovery information is transparent to Access Stratum. The ProSe Protocol allows only the discovery information that is valid for the announcement to be delivered to the AS.

The MAC layer receives the discovery information from the higher-level layer. The IP layer is not used for the discovery information transmission. The MAC layer determines (or decides) the resource that is to be used for announcing the discovery information received from the higher-level layer. The MAC layer generates a MAC protocol data unit (PDU), which carries the discovery information, and transmits the generated MAC PDU to the physical layer. Herein, a MAC header is not added.

The above-described operation may also be applied to vehicle-to-everything (V2X). Hereinafter, a device-to-device directly link may be referred to as a sidelink.

Hereinafter, the present invention will be described in detail.

Firstly, the semi-persistent scheduling (SPS) will be described in detail.

In the wireless communication system, the user equipment (UE) receives scheduling information, such as DL grant, UL grant, and so on, through the PDCCH, and, then, based on the received scheduling information, the UE performs operations of receiving the PDSCH and transmitting the PUSCH. Generally, the UL grant and the PDSCH are received within the same subframe. Thereafter, the PUSCH is transmitted after at least 4 subframes from the subframe that has received the UL grant. In addition to such dynamic scheduling, the LTE/LTE-A also provides semi-persistent scheduling (SPS).

Downlink or uplink SPS may announce (or notify) to the UE in which subframes the semi-persistent transmission (PUSCH)/reception (PDSCH) is/are performed through a higher layer signal, such as radio resource control (RRC). The parameter that are given as the higher layer signal may, for example, correspond to a cycle period and offset value of the subframe.

After recognizing the SPS transmission/reception through the RRC signaling, when the UE receives an activation or release signal of the SPS transmission through the physical downlink control channel (PDCCH)/enhanced PDCCH (EP-DCCH), the UE performs or releases the SPS transmission/reception. More specifically, even if the SPS is assigned through the RRC signaling, instead of immediately performing the SPS transmission/reception, in case the activation or release signal is received through the PDCCH/EPDCCH, the UE performs the SPS transmission/reception in a subframe corresponding to a subframe cycle period and offset value that are assigned to the corresponding subframe through the RRC signaling after applying modulation and a coding rate in accordance with a frequency resource (resource block) and modulation and coding scheme (MCS) information respective to the resource block assignment that is designated by the corresponding PDCCH/EPDCCH.

(WAN (VoIP(/UL)) communication related) SPS activation/release operations will hereinafter be described in more detail.

The UE may validate a semi-persistent scheduling activated PDCCH only when the following conditions are satisfied.

1) CRC parity bits that are acquired for the PDCCH payload should be scrambled by a semi-persistent scheduling C-RNTI, and 2) a 'new data indicator' field should be set to '0'.

The UE may validate a semi-persistent scheduling activated EPDCCH only when the following conditions are satisfied.

1) CRC parity bits that are acquired for the EPDCCH payload should be scrambled by a semi-persistent scheduling C-RNTI, and 2) a 'new data indicator' field should be set to '0'.

The UE may validate a semi-persistent scheduling activated MPDCCH only when the following conditions are satisfied.

1) CRC parity bits that are acquired for the MPDCCH payload should be scrambled by a semi-persistent scheduling C-RNTI, and 2) a 'new data indicator' field should be set to '0'.

The above-described validation is carried out in a case where all fields of the corresponding DCI format are configured as shown below in the following table. Once the validation is achieved, the UE may consider the received DCI information as valid semi-persistent activation/release. If the validation is not achieved, the received DCI format may be viewed to have been received with a non-matching CRC.

TABLE 1

|  | DCI format 0 | DCI format 1/1A | DCI format 2/2A/2B/2C/2D |
| --- | --- | --- | --- |
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 1 presented above shows an example of specific fields for SPS activated PDCCH/EPDCCH validation.

TABLE 2

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |

TABLE 2-continued

|  | DCI format 0 | DCI format 1A |
| --- | --- | --- |
| Redundancy version | N/A | set to '00' |
| Resource block assignment | N/A | Set to all '1's |

Table 2 presented above shows an example of specific fields for SPS released PDCCH/EPDCCH validation.

TABLE 3

|  | DCI format 6-0A | DCI format 6-1A |
| --- | --- | --- |
| HARQ process number | set to '000' | FDD: set to '000' TDD: set to '0000 |
| Redundancy version | set to '00' | set to '00' |
| TPC command for scheduled PUSCH | set to '00' | N/A |
| TPC command for scheduled PUCCH | N/A | set to '00' |

Table 3 presented above shows an example of specific fields for SPS activated MPDCCH validation.

TABLE 4

| Value of 'TPC command for PUCCH' $n_{PUCCH}^{(1,p)}$ | |
| --- | --- |
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

Table 4 presented above shows an example of specific fields for SPS released MPDCCH validation.

In case the DCI format indicates a downlink SPS activation, the TPC field for PUCCH may be used to indicate one PUCCH resource value, among the 4 PUCCH resource values configured by the higher layers. At this point, mapping may be defined as shown below in the following table.

TABLE 5

| Value of 'TPC command for PUCCH' $n_{PUCCH}^{(1,p)}$ | |
| --- | --- |
| '00' | The first PUCCH resource value configured by the higher layers |
| '01' | The second PUCCH resource value configured by the higher layers |
| '10' | The third PUCCH resource value configured by the higher layers |
| '11' | The fourth PUCCH resource value configured by the higher layers |

In a case where a plurality of sidelink (SL) and/or uplink (UL) semi-persistent scheduling (SPS) processes/configurations are configured (e.g., multiple SPS configurations(/processes) for uplink (and/or uplink+sidelink), e.g., SPS configuration/process for a Voice over internet protocol (VoIP), SPS configuration/process for an intelligent transport system (ITS)), the proposed methods that will hereinafter be described in detail propose methods for efficiently managing and operating such processes (e.g., SPS process (/configuration) activation/release, frequency resource re-assignment, HARQ re-transmission).

For example, the terms 'sidelink SPS process(/configuration)' and 'uplink SPS process(/configuration)' may each be interpreted as an SPS process(/configuration) for supporting 'PC5 link based V2X message transmission' and an SPS process(/configuration) for supporting 'UU link based V2X message transmission (and/or the existing 'WAN uplink(/VOIP)' SPS process(/configuration)).

[Proposed Method #1] By configuring(/signaling) (part of) a different (new) 'V2X_SPS-RNTI' per 'sidelink and/or uplink SPS process(/configuration)', independent management and operation (e.g., SPS process(/configuration) activation/release, frequency resource re-assignment, HARQ re-transmission) may be achieved for each 'sidelink and/or uplink process(/configuration)'.

For example, in case the corresponding rule is applied, this may be interpreted as (part of) different 'RNTI' values being configured(/signaled) between a plurality of sidelink SPS processes(/configurations) (or uplink SPS processes(/configurations)) and/or as (part of) different 'RNTI' values being configured(/signaled) between a sidelink SPS process (/configuration) and an uplink SPS process(/configuration).

Herein, as another example, (part of) different (or common) 'RNTI' values may also be configured(/signaled) between the existing (or conventional) WAN (VOIP(/uplink)) communication related SPS process(/configuration) (e.g., 'SPS C-RNTI') and the (V2X) uplink SPS process(/configuration) (and/or sidelink SPS process (/configuration)). This will hereinafter be described in more detail with reference to FIG. 8 to FIG. 10.

Figure 8:
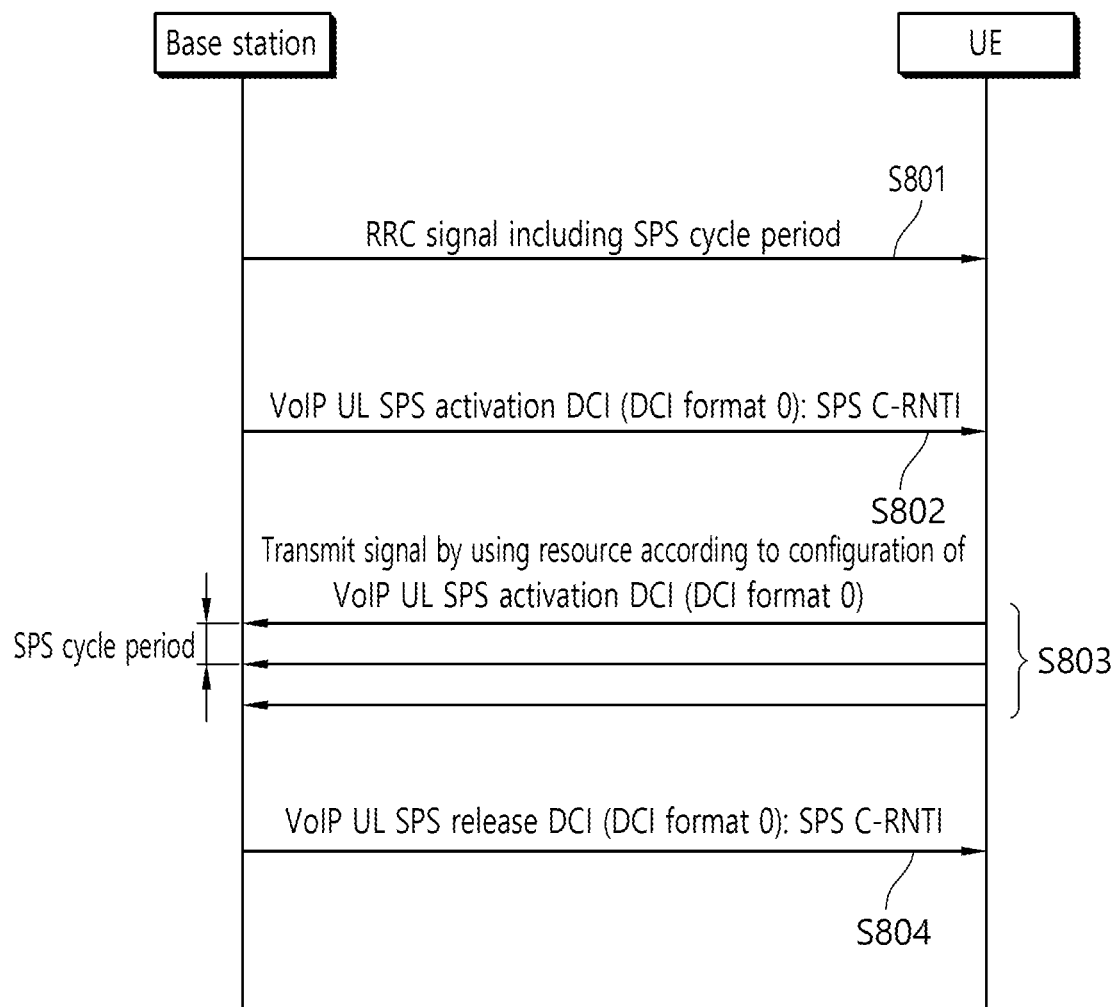
FIG. 8 shows an example of an existing uplink SPS process.

FIG. 8 shows an example of an existing uplink SPS process.

Referring to FIG. 8, the base station transmits a higher layer signal including an SPS cycle period, e.g., a radio resource control (RRC) signal to the UE (S801).

The base station may transmit, for example, an uplink SPS activation DCI for VoIP (this may be referred to as a VoIP UL SPS activation DCI) to the UE (S802). The VoIP UL SPS activation DCI may include a cyclic redundancy check (CRC), and the CRC may be scrambled by using an SPS-C-RNTI (hereinafter referred to as a first RNTI).

The UE transmits a signal to the base station at an SPS cycle period by using a resource according to the configuration of a VoIP UL SPS activation DCI (S803).

The UE receives a DCI that releases the VoIP UL SPS (this may be referred to as a VoIP UL SPS release DCI) (S804). The VoIP UL SPS release DCI may also include a CRC, and the CRC may be scrambled by using an SPS-C-RNTI (a first RNTI).

The VoIP UL SPS activation DCI/VoIP UL SPS release DCI may be received through a physical downlink control channel (PDCCH) or an enhanced PDCCH (EPDCCH).

Figure 9:
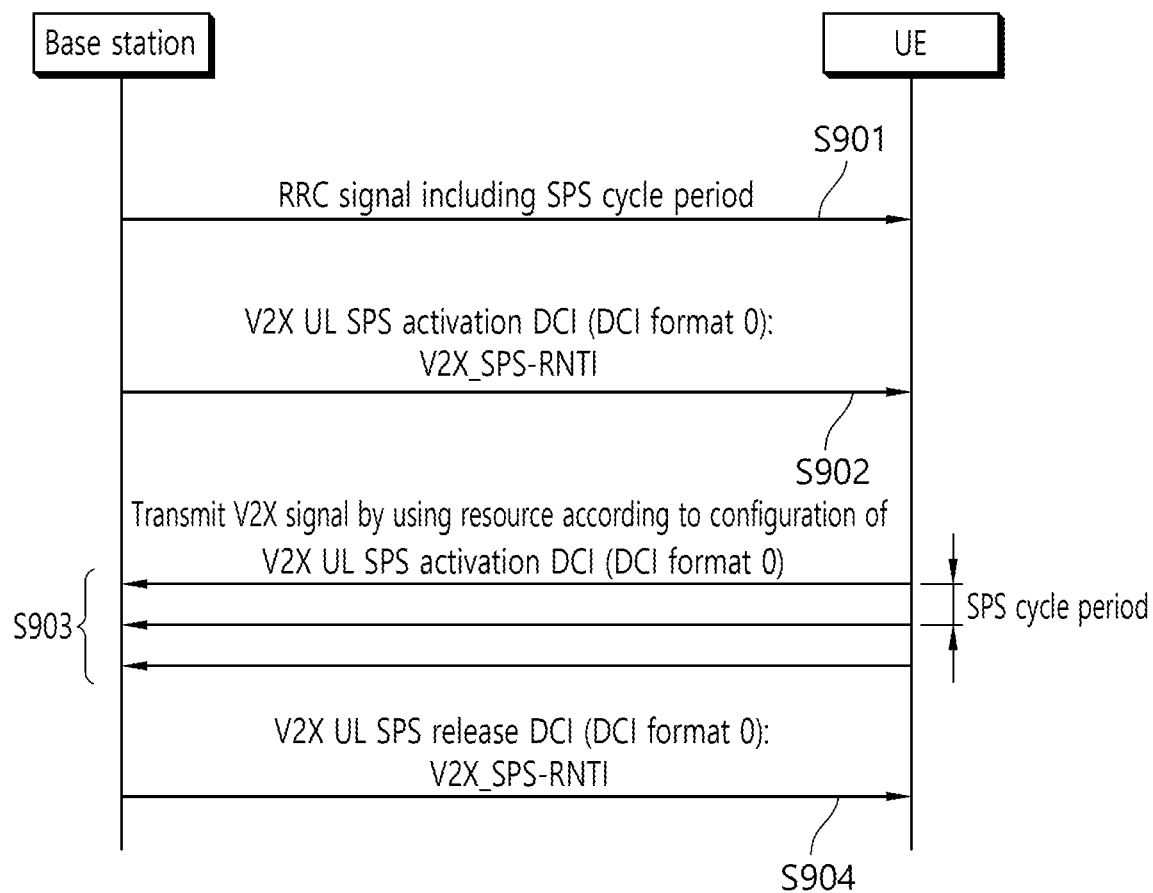
FIG. 9 shows an example of a case where an uplink SPS process is applied to the V2X.

FIG. 9 shows an example of a case where an uplink SPS process is applied to the V2X. Herein, the corresponding uplink SPS process will be referred to as a V2X uplink SPS process.

Referring to FIG. 9, the base station transmits a higher layer signal including an SPS cycle period, e.g., a radio resource control (RRC) signal to the UE (S901).

The base station may transmit, for example, an uplink SPS activation DCI for V2X (this may be referred to as a V2X UL SPS activation DCI) to the UE (S902). The V2X UL SPS activation DCI may include a cyclic redundancy check (CRC), and the CRC may be scrambled by using a V2X-SPS-RNTI (hereinafter referred to as a second RNTI). Herein, the second RNTI may correspond to another RNTI that is differentiated from the above-described first RNTI.

The UE transmits a V2X signal to the base station at an SPS cycle period by using a resource according to the configuration of a V2X UL SPS activation DCI (S903).

The UE receives a DCI that releases the V2X UL SPS (this may be referred to as a V2X UL SPS release DCI) (S904). The V2X UL SPS release DCI may also include a CRC, and the CRC may be scrambled by using a V2X-SPS-RNTI (a second RNTI).

Figure 10:
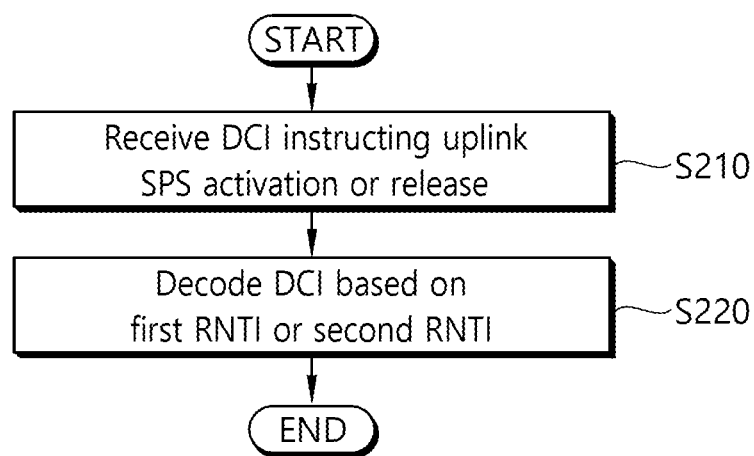
FIG. 10 shows a UE operation method according to uplink SPS.

FIG. 10 shows a UE operation method according to uplink SPS.

Referring to FIG. 10, the UE receives a DCI instructing an uplink SPS activation or release (S210). The UE decodes the DCI based on a first RNTI or a second RNTI (S220). The first RNTI and the second RNTI have already been described in detail, respectively, with reference to FIG. 8 and FIG. 9. FIG. 8 to FIG. 10 may correspond to application examples of the [Proposed Method #1].

[Proposed Method #2] A (single) common (or shared) 'V2X_SPS-RNTI' is configured(/signaled) to a plurality of 'sidelink (and/or uplink) SPS processes(/configurations), and this method may identify (or distinguish) to which 'sidelink (and/or uplink) SPS process(/configuration)' the corresponding control information is related through a (new) pre-defined(/signaled) specific field within a '(sidelink (and/or uplink)-SPS) (activation/release) DCI' that is decoded by using the corresponding RNTI (e.g., a 'sidelink (and/or uplink) SPS process(/configuration) index(/ID)' field and/or a field announcing an 'LCID' being linked(/interconnected) to a 'sidelink (and/or uplink) SPS process(/configuration) index(/ID)' (that is configured(/signaled) through a pre-defined signaling)).

As field(s) being used for the above-described purpose, a 'DM-RS CS (3 bit) field' (e.g., a case where a '((VOIP) uplink (and/or sidelink)-SPS) (activation/release) DCI' of the (existing) 'DCI format 0' type is (re-)used (for the purpose of a '(sidelink (and/or (V2X) uplink)-SPS) (activation/release) DCI')) and/or a 'HARQ ID (3/4 bit)/RV (2 bit) field' (e.g., a case where a '((VOIP) uplink(/downlink) (and/or sidelink)-SPS) (activation/release) DCI' of the (existing) 'DCI format 1/1A/2/2A/2B/2C/2D' type is (re-)used (for the purpose of a '((V2X) sidelink (and/or uplink)-SPS) (activation/release) DCI')) may be (re-)used.

Herein, for example, a size (X_size) of the field being used for the corresponding purpose may be fixed to a pre-configured(/signaled) value (e.g., '3 bit'), and, in case a (maximum) number of 'sidelink (and/or uplink) SPS processes(/configurations)' (SPS_NUM) being configured(/signaled) (in the form of a 'carrier(kell)-specific configuration') from a network (or serving) cell can be varied (or changed), '(X_size−ceiling(LOG 2(SPS_NUM)))' (and/or '(X_size−floor(LOG 2(SPS_NUM)))') bits (herein, for example, the 'ceiling(X)' and the 'floor(X)' may respectively indicate a function drawing a 'minimum integer value that is greater than or equal to X' and a function drawing a 'maximum integer value that is smaller than or equal to X') may be processed with zero (or a specific pre-configured(/signaled) value) padding (e.g., this may be used for the purpose of a 'virtual CRC').

Herein, for example, in case a common 'RNTI' value is configured(/signaled) between an existing WAN (VOIP(/uplink)) communication related SPS process(/configuration) and a (V2X) uplink SPS process(/configuration) (and/or in case a(/an) '(activation/release) DCI' having the same (payload) size is used), it may be distinguished to which one of the existing WAN (VOIP(/uplink)) communication related SPS process(/configuration) and the (V2X) uplink SPS process(/configuration) the corresponding control information is related through (a re-usage of) (A) a pre-defined(/signaled) new field (e.g., '1 bit') and/or (B) a pre-designated (/signaled) existing field within the '(activation/release) DCI' being decoded by using the corresponding common RNTI (this will hereinafter be referred to as C_V2XARDCI) (for example, in case the '(activation/release) DCI' of the (existing) 'DCI format 0' type is (re-)used, an 'MCS/RV (5 bits) field (MSB (1 bit))' and/or a 'TPC (2 bits) field (MSB (1 bit))' and/or a 'CS DM RS (3 bits) field (MSB (1 bit))' may be (re-)used).

Herein, for example, by defining a new field in the C_V2XARDCI, in case the (payload) size becomes larger than the '(activation/release) DCI' that is related to the existing WAN (VOIP(/uplink)) communication (that is transmitted within the same user equipment (UE) specific search space (USS)(/common search space (CSS))), in order to prevent an increase in the number of blind decoding sessions of the UE, zero (or a specific pre-configured(/signaled) value) padding may be performed (e.g., this may be used for the purpose of a 'virtual CRC') until the WANARDCI (payload) size becomes identical to the (payload) size of the C_V2XARDCI.

Figure 11:
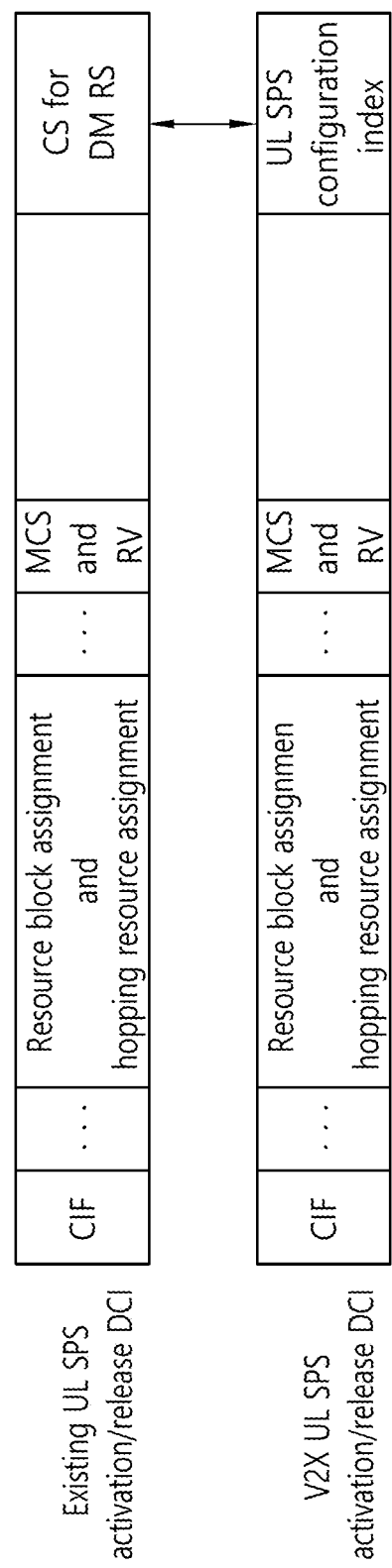
FIG. 11 is a diagram showing a comparison between the existing (VoIP) uplink SPS activation/release DCI (first DCI) and the V2X uplink SPS activation/release DCI (second DCI) by applying the [Proposed Method #2]

FIG. 11 is a diagram showing a comparison between the existing (VoIP) uplink SPS activation/release DCI (first DCI) and the V2X uplink SPS activation/release DCI (second DCI) by applying the [Proposed Method #2]. As respectively described above with reference to FIG. 8 and FIG. 9, the first DCI may be CRC-scrambled by the SPS-C-RNTI (first RNTI), and the second DCI may be CRC-scrambled by the V2X-SPS-RNTI (second RNTI).

Referring to FIG. 11, each of the first DCI and the second DCI includes a plurality of fields. The first DCI and the second DCI may include a plurality of common fields and a plurality of fields that are differentiated from one another. For example, the first DCI and the second DCI may commonly have a carrier indication field (0 bit or 3 bits), a resource block assignment and hopping resource assignment field, an MCS and redundancy version (RV) field, and so on. Conversely, the first DCI may include a cyclic shift (CS) field corresponding to a demodulation reference signal (DM-RS) (this will hereinafter be referred to as a DM-RS CS field), whereas the second DCI may include an uplink SPS configuration index field instead of the DM-RS CS field.

In light of the RNTI, if the DCI is CRC-scrambled by the V2X-SPS-RNTI (second RNTI), it may be expressed that the DM-RS CS field (this refers to the above-described CS DM RS (3 bits) field) does not exist and that the uplink SPS configuration index field exists. Alternatively, it may also be expressed that, in the first DCI, the DM-RS CS field is used for its initial purpose, which corresponds to announcing (or notifying) the cyclic shift of the DM-RS, and that, in the second DCI, the DM-RS CS field is used as an uplink SPS configuration index field.

Figure 12:
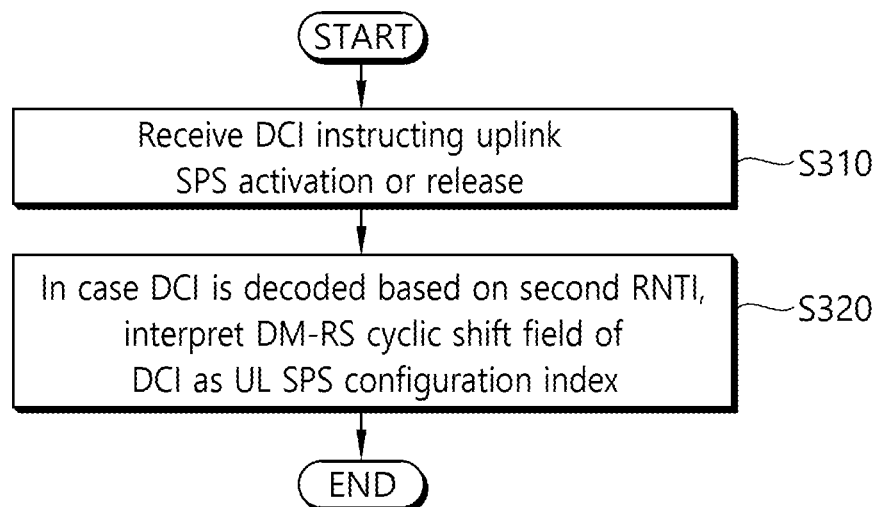
FIG. 12 shows an example of a method for interpreting a specific field when decoding the first DCI and the second DCI.

FIG. 12 shows an example of a method for interpreting a specific field when decoding the first DCI and the second DCI.

Referring to FIG. 12, the UE receives a DCI indicating uplink SPS activation or release (S310), and, then, in case the DCI is decoded based on a second RNTI, a DM-RS cyclic shift field of the DCI is interpreted as a UL SPS configuration index (S320).

As described above in [Proposed Method #2] and FIG. 11, in the V2X uplink SPS activation/release DCI (second DCI), the DM-RS cyclic shift field included in the existing uplink SPS activation/release DCI (first DCI) may be interpreted as a UL SPS configuration index. As described above, this may also be expressed as the UL SPS configuration index field being included in the V2X uplink SPS activation/release DCI (second DCI) instead of the DM-RS cyclic shift field.

Hereinafter, a DCI scheduling a physical sidelink control channel (PSCCH) or a physical sidelink shared channel (PSSCH) will be described in detail. The DCI scheduling the sidelink channel(s) may include a dynamic DCI (e.g., a method of scheduling only one transmission (by using only one DCI)) and a SPS method-based DCI (e.g., a method of scheduling a plurality of transmission (by using only one DCI), and, more specifically, a DCI activation/release a sidelink SPS).

Figure 13:
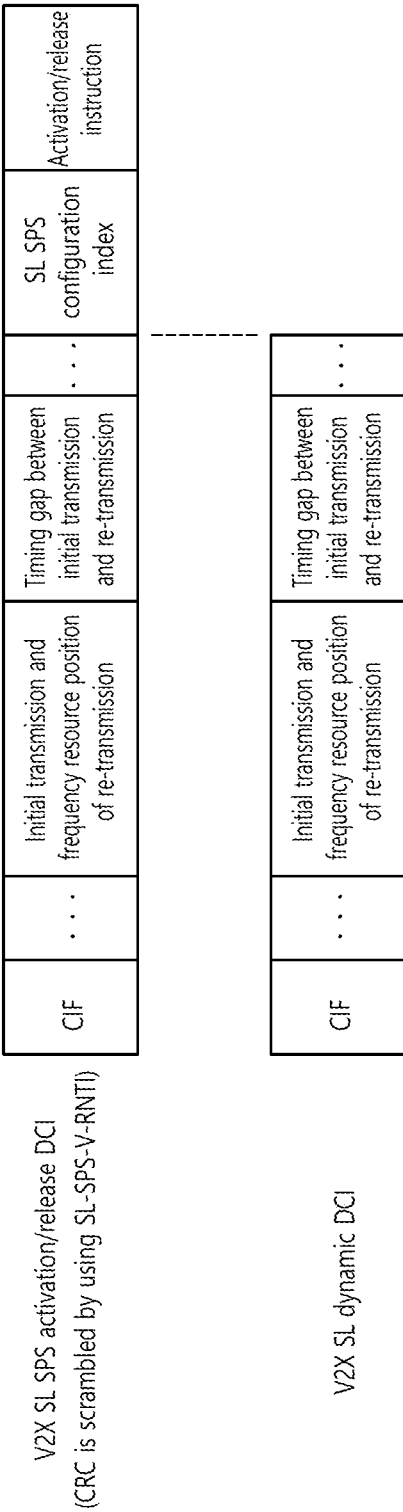
FIG. 13 is a diagram showing a comparison between a DCI for dynamically scheduling a sidelink channel (DCI for Dynamic scheduling (V2X SL dynamic DCI)) and a sidelink channel SPS activation/release DCI (V2X SL SPS activation/release DCI).

FIG. 13 is a diagram showing a comparison between a DCI for dynamically scheduling a sidelink channel (DCI for Dynamic scheduling (V2X SL dynamic DCI)) and a sidelink channel SPS activation/release DCI (V2X SL SPS activation/release DCI).

The total bit sizes of each of the V2X SL dynamic DCI and the V2X SL SPS activation/release DCI may be differently configured. The V2X SL dynamic DCI and the V2X SL SPS activation/release DCI may include a common field, and the V2X SL SPS activation/release DCI may further include additional fields. More specifically, the V2X SL SPS activation/release DCI may have a larger total bit size.

For example, the V2X SL dynamic DCI and the V2X SL SPS activation/release DCI may commonly include a carrier indication field (3 bits), a field indicating a lowest index of a sub-channel for a sub-channel assignment for an initial transmission, a field indicating a frequency resource position, a field indicating a time gap between an initial transmission and a re-transmission, and so on.

In comparison with the V2X SL dynamic DCI, the V2X SL SPS activation/release DCI may further include a sidelink SPS configuration index (3 bits) and a sidelink SPS activation/release field (1 bit).

Figure 14:
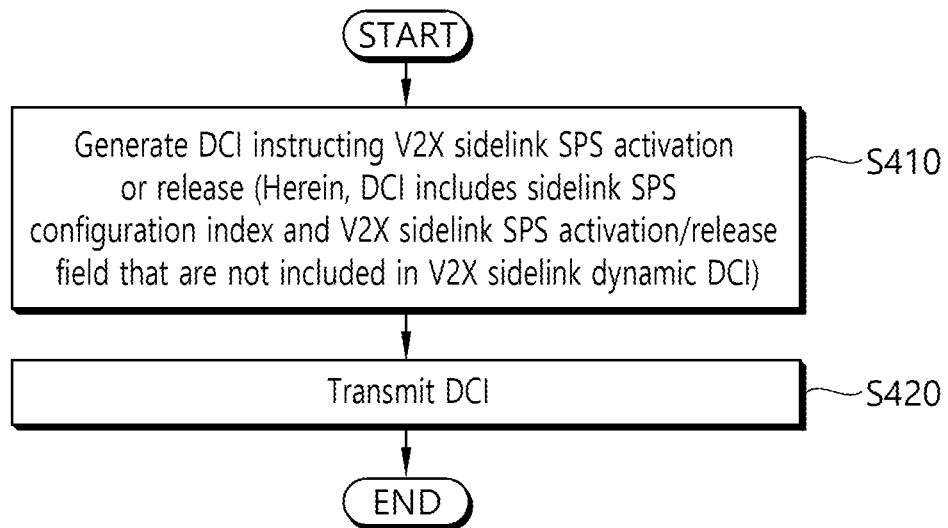
FIG. 14 shows an example of a method for transmitting downlink control information for sidelink scheduling according to another exemplary embodiment of the present invention.

FIG. 14 shows an example of a method for transmitting downlink control information for sidelink scheduling according to another exemplary embodiment of the present invention.

Referring to FIG. 14, a wireless device generates a DCI instructing a V2X sidelink SPS activation or release (S410), and, then, the wireless device transmits the DCI (S420).

At this point, the DCI may further include a sidelink SPS configuration index (3 bits) and a V2X sidelink SPS activation/release field (1 bit), which are not included in the V2X sidelink dynamic DCI. More specifically, the V2X sidelink SPS activation/release DCI may have a larger total bit size as compared to the V2X sidelink dynamic DCI.

The sidelink SPS configuration index field may include information indicating at least one the plurality of sidelink SPS configurations.

[Proposed Method #3] (For example, in case a (single) common 'V2X_SPS-RNTI' and '(activation/release) DCI format' are used for the management and operation of a plurality of 'sidelink and/or uplink SPS process(/configuration)') a subframe (SF) set(/cell set) (and/or a search space (SS) type (CSS/USS) and/or a control channel (PDCCH/EPDCCH set) type) in which the related '(sidelink and/or uplink-SPS) (activation/release) DCI' is received for each 'sidelink and/or uplink SPS process(/configuration)' may be differently (or independently) configured(/signaled).

For example, such operation may also be (limitedly) applied only in a situation where a plurality of sidelink and/or uplink SPS transmissions are not performed in one subframe.

In case (part of) the above-described proposed methods (e.g., [Proposed Method #1], [Proposed Method #2], [Proposed Method #3]) are applied, (A) a differentiation (related to SPS process(/configuration) activation/release, frequency resource re-assignment, HARQ re-transmission operation(/instruction)) may be performed between a plurality of 'sidelink SPS process(/configuration)' (or 'uplink SPS process(/configuration)') and/or (B) a differentiation (related to SPS process(/configuration) activation/release, frequency resource re-assignment, HARQ re-transmission operation(/instruction)) may be performed between a 'sidelink SPS process(/configuration)' and an 'uplink SPS process(/configuration)'.

For example, a (single) common 'V2X_SPS-RNTI' may be configured(/signaled) to a plurality of 'sidelink and/or uplink SPS processes(/configurations)', and an 'activation/release'(/frequency resource re-assignment/HARQ re-transmission) instruction that is related to a plurality of 'sidelink and/or uplink SPS processes(/configurations)' may be performed at the same time through one or more (new) pre-defined(/signaled) specific fields within a '(sidelink and/or uplink-SPS) (activation/release) DCI', which is decoded by the corresponding RNTI.

For example, (A) in case the (new) specific field(s) can be implemented in the form of a bitmap (e.g., in case (a maximum of) '4' 'sidelink and/or uplink SPS processes(/configurations)' can be processed with 'activation/release' (/frequency resource re-assignment/HARQ re-transmission) at the same time), the corresponding field may be implemented in the form of a bitmap having a length of '4 bits' ('WXYZ').

For example, in the bitmap each of W, X, Y, and Z corresponds to one bit each being given a value of 0 or 1. In each bit, 0/1 may respectively indicate the activation/release of the corresponding sidelink and/or uplink SPS process(/configuration). For example, W may instruct a 'sidelink and/or uplink SPS process(/configuration) #0 activation/release'. X may instruct a 'sidelink and/or uplink SPS process(/configuration) #1 activation/release'. Y may instruct a 'sidelink and/or uplink SPS process(/configuration) #2 activation/release'. And, Z may instruct a 'sidelink and/or uplink SPS process(/configuration) #3 activation/release'. This may also be understood as the 'sidelink and/or uplink SPS process(/configuration) index(/ID)' (information) that is linked with(/interconnected to) a specific field value being pre-configured(/signaled) in advance.

Alternatively, (B) the (new) specific field(s) may be implemented in the same number of fields as the (maximum) number of 'sidelink and/or uplink SPS processes(/configurations)' that can be processed with 'activation/release'(/frequency resource re-assignment/HARQ re-transmission) at the same time. For example, in case (a maximum of) '4' 'sidelink and/or uplink SPS processes(/configurations)' may be 'activated/released' at the same time, and, in case the 'sidelink and/or uplink SPS process(/configuration) index(/ID)' is expressed as '3 bits', the corresponding field(s) may be implemented as '4' fields each having the length of '3 bits'.

(According to the proposed method, in case 'activation' (/release/frequency resource re-assignment/HARQ re-transmission) related to a plurality of 'sidelink and/or uplink SPS processes(/configurations)' are indicated (or instructed) at the same time, in order to reduce collision between 'sidelink and/or uplink SPS processes(/configurations)' having the same 'cycle period value' and/or 'frequency(/time) resource position value', among the corresponding 'sidelink and/or uplink SPS processes(/configurations)' (that are simultaneously instructed (or indicated)),) the 'subframe offset' information per 'sidelink and/or uplink SPS process(/configuration)' may be configured through a 'subframe offset' information field per 'sidelink and/or uplink SPS processes(/configurations)' being (newly) defined within (A) a 'higher layer signaling (e.g., 'RRC')' or (B) a '(sidelink and/or uplink-SPS) (activation/release) DCI'.

Herein, for example, 'subframe gap (SF gap)' information being applied between a plurality of 'sidelink and/or uplink SPS processes(/configurations)' (that are indicated at the same time) may be configured(/signaled) (e.g., in case '2' 'sidelink and/or uplink SPS processes(/configurations)' having the same 'cycle period value (P)' and 'frequency(/time) resource position value' are 'activated' at the same time, (according to an increasing order (or a decreasing order) of the 'sidelink and/or uplink SPS process(/configuration) index(/ID)') a (periodic) resource related to 'sidelink and/or uplink SPS process(/configuration) #1' may be indicated in 'SF#0, SF#P, . . . , SF#(N·P)' (or 'SF#(0+SF GAP), SF#(P+SF GAP), . . . , SF#(N·P+SF GAP)'), and a (periodic) resource related to 'sidelink and/or uplink SPS process(/configuration) #2' may be indicated in 'SF#(O+SF GAP), SF#(P+SF GAP), . . . , SF#(N·P+SF GAP)' (or in 'SF#0, SF#P, . . . , SF#(N·P)')). Herein, SF indicates a subframe.

Herein, as an additional example, the 'sidelink and/or uplink SPS process(/configuration)' that is processed with 'activation'(/release/frequency resource re-assignment/ HARQ re-transmission) may be limited to those having different 'cycle period values' and/or 'frequency(/time) resource position values'.

For example, (A) (according to the above-described proposed method) in case 'sidelink and/or uplink SPS processes (/configurations)' having the same 'cycle period value' and/or 'frequency(/time) resource position value' are processed with 'activation'(/release/frequency resource re-assignment/HARQ re-transmission) at the same time and/or (B) in case a plurality of 'sidelink and/or uplink SPS processes(/configurations)' having (partially) different 'resource block sizes/positions' and/or 'cycle period values' and/or 'MCS values', and so on, are configured(/signaled), which 'sidelink and/or uplink SPS process(/configuration)' is valid within the current subframe (set) may be announced (or notified) through a pre-defined (higher layer/physical layer) signaling (e.g., a '(sidelink and/or uplink-SPS) (activation/release) DCI').

A (partially) different parameter (set) (e.g., 'resource block size/position', 'MCS value') may be mapped(/signaled) per pre-configured(/signaled) subframe set, and the corresponding parameter (set) may be applied to the 'sidelink and/or uplink SPS process(/configuration)' that is valid ('on') (or being used) within a specific subframe set.

Alternatively, (unlike the above-described proposed method) in case the 'sidelink and/or uplink SPS process (configuration) index(/ID)' field(s) is/are not defined within the '(sidelink and/or uplink-SPS) (activation/release) DCI' and a periodic resource related to 'sidelink and/or uplink SPS process(/configuration) #X' is indicated at a time point of 'SF#N', the '(sidelink and/or uplink-SPS) release(/frequency resource re-assigning/HARQ re-transmitting) DCI', which is received at a time point of 'SF#(N-K)' (e.g., 'K=4'), may be viewed(/assumed) as a DCI (implicitly) indicating a 'release(/frequency resource re-assignment/ HARQ re-transmission)' of the corresponding 'sidelink and/or uplink SPS process(/configuration) #X'.

For example, (A) the 'Mode 1 DCI' (e.g., V2X SL (and/or uplink) SPS activation/release DCI) announcing (or notifying) (PSCCH and/or PSSCH) scheduling information related to sidelink (and/or uplink) SPS may be configured of (part of) the following fields. And/Or, (B) 'K' number of (repeated) re-transmission operations related to the same transmission block (TB) may be defined to be performed in accordance with (part of) the following rules.

The decoding of 'Mode 1 DCI' may be attempted to be performed by using an (additionally configured(/signaled)) 'RNTI' that is different from (or the same as) the (above-described) '(sidelink and/or uplink-SPS) (activation/release) DCI'.

(Part of) The field(s) within the 'Mode 1 DCI' (e.g., at least one of (Example #1-1), (Example #1-2), (Example #1-3), (Example #1-5), and (Example #1-6), which will be described below) may be re-configured(/used) as a field(/fields) of 'scheduling assignment(/PSCCH)'.

Types of fields configuring the 'Mode 1 DCI'

Example #1-1

A 'sidelink and/or uplink SPS process(/configuration) index(/ID)' field.

Example #1-2

A 'timing gap' (indication) field between 'data(/PSSCH)' being interconnected to the 'scheduling assignment(/PSCCH)' (and/or an interval (indication)) field between a 'resource (re-)selection triggering timing' and a 'scheduling assignment(/PSCCH) transmission timing'). Herein, for example, when being operated in 'Mode 1', the corresponding field value may be fixed to a pre-defined(/signaled) specific value (e.g., 'timing gap=0'), and, in this case, the corresponding filed may also be omitted.

Example #1-3

A 're-transmission number counter(/indicator) (related to the same transmission block (TB))' field (and/or 'a redundancy version (RV) (related to the same TB)' field). Herein, for example, the corresponding field may, most particularly, be useful (only) when the 'Mode 1 DCI' (and/or 'SA(/PSCCH)') is(/are) transmitted along with one another (or collectively) during each re-transmission related to the same TB.

Example #1-4

A 'SA(/PSCCH)' related frequency(/time) resource information field.

Example #1-5

A 'data(/PSSCH)' related frequency(/time) resource information field.

Example #1-6

A 'SA(/PSCCH)' and/or 'data(/PSSCH)' related 'transmit power control (TPC) command' field (e.g., in case a size of the corresponding 'TPC command' field is equal to '1 bit', a '0' value may indicate an 'application of a pre-configured (/signaled) (maximum) transmission power value (i.e., 'no open-loop power control')', and a '1' value may indicate a 'determination of the transmission power value according to a pre-defined 'open-loop power control' equation)' and/or a field announcing (or notifying) whether or not a 'data(/PSSCH)' related 'frequency hopping' is applied and/or a 'data(/PSSCH)' related 'time resource pattern (T-RPT)' field.

Example #1-7

An indicator field related to a 'sidelink and/or uplink SPS process(/configuration) activation(/release)'.

Example #1-8

An information field related to a time period having a pre-determined length(/size) (e.g., 'subframe' unit) during which a resource related to a 'sidelink and/or uplink SPS process(/configuration)' is maintained (or an information field indicating a number of 'sidelink and/or uplink SPS process(/configuration)' cycle periods during which the corresponding resource is maintained). This field may be interpreted as a type of 'activation duration timer' information.

In case the above-described 'Mode 1 DCI' is received, a rule of 'K' number of (repeated) re-transmission operations that is related to the same transmission block (TB) may be determined by at least one of the following examples.

Example #2-1

In case the 'Mode 1 DCI' (and/or 'SA(/PSCCH)') is(/are) transmitted along with one another (or collectively) during each re-transmission(/initial transmission) related to the same TB, the re-transmission(/initial transmission) may be performed in accordance with the ('SA(/PSCCH)' and/or 'data(/PSSCH)') scheduling information that is announced (/indicated) by the above-described fields within the corresponding 'Mode 1 DCI' (e.g., (Example #1-1)(/(Example #1-2)), (Example #1-3), (Example #1-4), (Example #1-5), and so on).

Example #2-2

In order to perform 'K' number of (repeated) re-transmissions related to the same TB, in case only one 'Mode 1 DCI' (and/or 'SA(/PSCCH)') related to the initial transmission scheduling is transmitted, (A) it may be assumed that the ('data(/PSSCH)') re-transmission is performed within consecutive subframes by using the same frequency resource as the initial transmission or (B) time resource pattern (T-RPT) information being related to the ('data(/PSSCH)') re-transmission(/initial transmission) may be announced (or notified) within (one) 'Mode 1 DCI' (and/or 'SA(/PSCCH)') related to the initial transmission scheduling. For example, in case of (B), it may be assumed that the re-transmission related frequency resource is identical to the frequency resource of the initial transmission.

Figure 15:
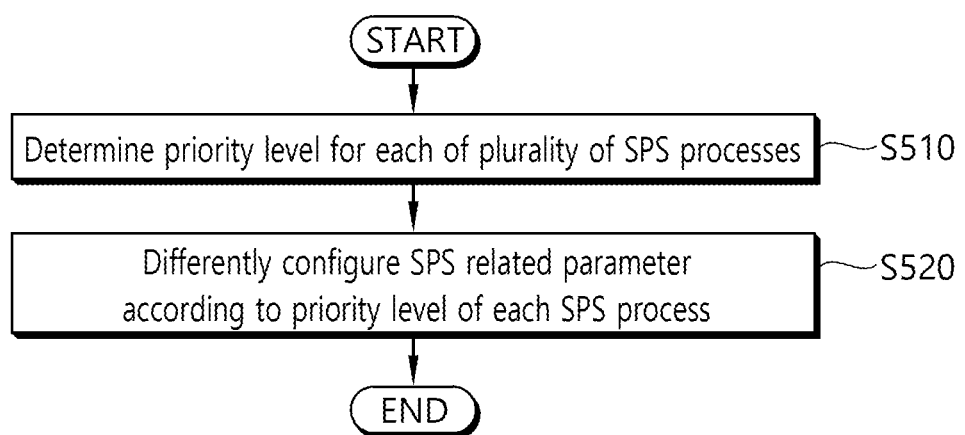
FIG. 15 shows an example of a method for performing an SPS process according to yet another exemplary embodiment of the present invention.

FIG. 15 shows an example of a method for performing an SPS process according to yet another exemplary embodiment of the present invention.

Referring to FIG. 15, the wireless device determines a priority level corresponding to each of a plurality of SPS processes (S510), and a SPS related parameter may be differently configured in accordance with the priority level of each SPS process (S520). The SPS processes may correspond to SPS processes(/configurations) corresponding to a sidelink and/or SPS processes(/configurations) corresponding to an uplink. The SPS related parameter may, for example, include at least one of a first information announcing a timing gap between a sidelink control information and data being scheduled by the sidelink control information, a second information announcing a timing gap between a time point when a resource selection is triggered and the sidelink control information, a third information announcing a sensing window size, which corresponds to a section during which sensing is to be performed for the resource selection, and a fourth information related to an open-loop transmission power.

More specifically, in case a plurality of 'sidelink and/or uplink SPS processes(/configurations)' are configured(/signaled), for example, 'timing gap' values between the 'data (/PSSCH)' being interconnected to the 'SA(/PSCCH)' per 'sidelink and/or uplink SPS process(/configuration) (set)' (and/or an interval (or gap) between a 'resource (re-)selection triggering timing' and a 'SA(/PSCCH) transmission timing' and/or a 'sensing window size (that is based on SA decoding/energy measurement)' and/or an '(open-loop) transmission power parameter') may be differently configured(/signaled). Accordingly, parameter levels between the 'sidelink and/or uplink SPS processes(/configurations) (set)' may be (implicitly) designated differently.

For example, by configuring(/signaling) a 'timing gap' having a relatively large value (or small value) (and/or an interval (or gap) between a 'resource (re-)selection triggering timing' and a 'SA(/PSCCH) transmission timing' and/or a '(SA decoding/energy measurement based) sensing window size') within a 'sidelink and/or uplink SPS process(/configuration) (set)' having a relatively high priority level, a V2X UE performing V2X communication through the configuration(/signaling) of a 'sidelink and/or uplink SPS process(/configuration) (set)' having a relatively low priority level (i.e., a 'timing gap' having a relatively small value (or large value) (and/or an interval (or gap) between a 'resource (re-)selection triggering timing' and a 'SA(/PSCCH) transmission timing' and/or a '(SA decoding/energy measurement based) sensing window size') may be capable of detecting(/sensing) a 'SA(/PSCCH)' having a relatively high priority level (at a high probability) and may also be capable of selecting(/scheduling) its own 'data(/PSSCH)' resource while avoiding (as much as possible) the 'data(/PSSCH)' being scheduled by the corresponding 'SA(/PSCCH)'.

The '(open-loop) transmission power parameter(s)' having a relatively high value (e.g., 'P_O' and/or 'ALPHA', and so on) having a relatively large value may be configured(/signaled) within a 'sidelink and/or uplink SPS process(/configuration) (set)' having a relatively high priority level. Herein, for example, the 'sidelink and/or uplink SPS process(/configuration) (set)' having a relatively high priority level may be used(/assigned) for an 'event-triggered V2X message transmission(/service type)' and/or a 'service type requiring a relatively high 'reliability'.

More specifically, the first information, the second information, and the third information corresponding to an SPS process having a relatively high priority level, among a plurality of SPS processes, may be configured to have larger values (or smaller values) than the first information, the second information, and the third information corresponding to an SPS process having a relatively low priority level.

Additionally, among the plurality of SPS processes, the fourth information corresponding to the SPS process having a relatively high priority level may be configured to have a larger value (or a smaller value) than the fourth information corresponding to the SPS process having a relatively low priority level.

Among the plurality of SPS processes, the SPS process having the relatively high priority level may be used for a vehicle-to-everything (V2X) message transmission that is triggered by an event.

Among the plurality of SPS processes, the SPS process having the relatively high priority level may be used for a service type requiring a relatively high reliability.

In case a pre-defined event occurs (e.g., in case a speed/travel direction/position variation (or change), and so on, equal to or greater than a pre-defined(/signaled) threshold value (as compared to a previous time point at which a 'V2X message transmission' has been performed) occurs, a 'V2X message (e.g., 'CAM') generation(/transmission)' may be (immediately) triggered. Accordingly, a 'V2X message generation(/transmission)' related 'cycle period' and/or 'size variation pattern' (and/or an interval between consecutive 'V2X message generations(/transmissions)'), and so on, may be changed (or varied) (within the time domain).

When considering such problem(/phenomenon), it may be difficult for the V2X UE to perform 'V2X message transmission' of high 'reliability' (and/or satisfying the 'latency requirement') through a specific cycle period and/or a time/frequency resource size and/or MCS of a 'single SPS configuration/process', which is/are configured(/signaled) by the base station. In order to resolve this problem, the cycle period related to the 'single SPS configuration(/process)' may be configured to be (extremely) short and a large size of the (time/frequency) resource may be assigned. However, in the aspect of efficient resource management, this method is not preferable.

As a solution, the base station may configure(/signal) 'multiple SPS configurations(/processes)' (having different cycle periods and/or (time/frequency) resource sizes (and/or MCS)) to the V2X UE and, then, may also allow the V2X UE to report (part of) the following information.

The information report may be performed through a pre-defined(/signaled) channel (e.g., 'PUSCH(/PUCCH)', 'SR'). The base station that has received(/been reported of) such information may 'release'(/'de-activate') the 'SPS configuration(/process)' that is not used by the corresponding V2X UE (or (most) inappropriate to the corresponding V2X UE), or the corresponding base station may newly configure (/signal) a (most) appropriate 'SPS configuration(/process)' to the corresponding V2X UE (or the cycle period and/or (time/frequency) resource size (and/or MCS) related to the (existing) 'SPS configuration(/process)').

As another example, the base station that has received(/been reported of) such information may (finally) instruct the corresponding V2X UE to perform switching to the (most) appropriate 'SPS configuration(/process)' among the 'multiple SPS configurations(/processes)'.

Herein, for example, the corresponding switching instruction may be performed through a pre-defined(/signaled) channel (e.g., '(E)PDCCH(/PDSCH)'). Herein, for example, this rule may be limitedly applied only to the 'Mode 1 (i.e., a method according to which the base station controls(/signals) the 'V2X message transmission' related scheduling information)' based V2X communication and/or 'RRC_connected V2X UE(/V2X UE within the cell coverage)'.

The V2X UE may report at least one of the information described below.

Example #A

'SPS configuration(/process) (index/ID) information' that is used by the corresponding V2X UE (or (most) appropriate to the corresponding V2X UE) (and/or that is not used by the corresponding V2X UE (or (most) inappropriate to the corresponding V2X UE), among the configured(/signaled) 'multiple SPS configurations(/processes)'.

Example #B

'Utilization information' and/or 'collision (with another V2 UE) detection information' and/or 'interference(/energy)

measurement information' and/or 'timing misalignment' information between a time point(/cycle period) at which its (current) 'V2X message transmission(/generation) is misaligned (e.g., this may also be interpreted as'(estimated) cycle period/offset information that is appropriate to the (current) 'V2X message transmission(/generation)' time point(/cycle period) of the corresponding V2X UE) per configured(/signaled) 'multiple SPS configurations(/processes)'.

As another example, a V2X UE being configured(/signaled) with 'multiple SPS configurations(/processes)' having different cycle periods and/or (time/frequency) resource sizes (and/or MCS) from the base station may select/use a 'SPS configuration(/process)' that is most appropriate to the corresponding V2X UE, and the V2X UE may report the respective result (e.g., 'SPS configuration(/process) (index/ID) information' that is selected/used by the V2X UE) to the base station.

Hereinafter, a method for efficiently supporting V2X communication related sidelink SPS operations and uplink SPS operations, e.g., a method for configuring a DCI format field will be described in detail.

Firstly, sidelink SPS operations will be described in detail.

In case of Mode 1 SPS, the base station may configure a plurality of (multiple) SPS configurations to the UE. A SPS configuration specific MCS and a SPS configuration specific cycle period may be configured. The base station may trigger/release dynamically different SPS configurations by using the PDCCH/EPDCCH. Before a transmission time point that is associated to the SPS configuration, the UE may announce to the base station that the UE will not be performing data transmission.

For V2V, Mode 1 may support cross carrier scheduling and dynamic scheduling for sidelink SPS.

The multiple SPS configuration will hereinafter be described in detail.

In a PC 5-based Mode 1 SPS, the base station may configure multiple SPS configurations. The parameters in each SPS configuration may be pre-determined (or determined in advance) by a higher layer signal. For example, an SPS offset may vary per SPS configuration, and an accurate mapping between an index of each SPS configuration and an SPS offset value may be defined by an RRC signal.

The UE may request for a wanted SPS configuration, and the base station may activate the SPS configuration in accordance with the request made by the UE. The configuration index of the SPS configuration may be delivered through an SPS trigger message, and, accordingly, the wanted SPS configuration may be verified. If the UE is capable of managing and operating only one SPS configuration at a time, the configuration index of the SPS configuration may be converted to several bits. For example, if a total of 8 SPS configurations exist, a configuration index that is activated or that is to be activated may be announced through 3 bits, and this may then be delivered through an SPS trigger message.

Conversely, if the UE is capable of managing and operating a plurality of SPS configurations at the same time, indexes corresponding to the plurality of SPS configurations may be expressed in the form of a bitmap. For example, if a total of 8 SPS configurations exist, a configuration index that is activated or that is to be activated may be announced through a bitmap of 8 bits, and this may then be delivered through an SPS trigger message.

After the triggering or release of a sidelink SPS configuration, if the base station does not monitor a sidelink message, the base station cannot confirm whether the UE has actually performed the SPS message transmission or whether the UE has suspended the transmission, and so on. Therefore, the UE may feedback an ACK/NACK corresponding to whether or not the UE has correctly received sidelink SPS trigger/release message.

<(E)PDCCH for Sidelink SPS>

The DCI for a sidelink SPS may be transmitted through a PDCCH or an EPDCCH. Such DCI may be referred to as DCI Format 5. DCI Format 5 may include at least one of the following fields.

A resource indication field for the PSCCH. This field may be determined to have a size of 6 bits.

A TPC command for the PSCCH and the PSSCH. This field may be determined to have a size of 1 bit.

A frequency hopping flag (1 bit), a resource block assignment and hopping resource assignment field (depending upon the bandwidth, this field may be determined to have a size of any one of 5 bits to 13 bits). A time resource pattern (7 bits).

If a number of information bits included in DCI Format 5, which is mapped to a given search space, is smaller than a payload size of DCI Format 0, which schedules the same serving cell, 0 (zero) values may be appended to DCI Format 5 so that the payload size can be the same as the payload size of DCI Format 0 (zero padding). In this case, bits of the appended 0 (zero) values, i.e., the number of zero padding bits may be equal to 0 or may be equal to diverse values other than 0. When considering this characteristic, it is will not be preferable to use the zero padding bits as a new field. More specifically, in order to adopt a new field, such as an SPS configuration index, to a DCI format, part (or some) of the existing fields may be required to be changed. Most particularly, this may correspond to a case where an existing DCI format (e.g., DCI Format 5) is re-used.

Considering the aspects of complexity in the detection (blind decoding) of an SPS configuration and saving (E)PDCCH resources, the 2 methods described below may be taken into consideration.

1) A method of using different RNTIs for each SPS configuration. According to this method, additional (or additionally appended) DCI bits are not required.

2) A method of adopting an 'SPS configuration index' field while using the same RNTI.

In the method where the DCI bits are not increased, a specific RNTI may be assigned to each SPS configuration. For example, different RNTIs, such as SL SPS C-RNTI 0, SL SPS C-RNTI 1, . . . , may be assigned to the SPS configuration. In this case, an excessively large number of RNTIs may be needed, and the UE may be required to perform a large number of blind decoding sessions in order to detect the SPS trigger/release message. Therefore, it may be preferable to perform the method of 2) rather than the method 1). More specifically, it may be preferable that each SPS configuration uses a common RNTI and that each SPS configuration includes a field indicating to which SPS configuration the trigger/release corresponds.

The SPS configuration field may be expressed as an index of the SPS configuration. For example, in case 7 SPS configurations exist, the size of an SPS configuration field may be equal to 3 bits. The SPS configuration field may also be expressed in the form of a bitmap. The example presented above, the SPS configuration field may be expressed as a bitmap of 7 bits. In this case, a simultaneous management and operation of the plurality of SPS configurations may be adequate for performing indication (or instruction).

Hereinafter, cross carrier scheduling and dynamic scheduling for sidelink SPS for V2V in Mode 1 will be described in detail. It is preferable that a(n) (E)PDCCH design for a sidelink SPS is compatible to a sidelink dynamic scheduling. One of the methods for achieving this is to include an indication field indicating whether the design is for dynamic scheduling or for SPS scheduling. A more resource-saving method corresponds to differentiating the scheduling mode by the SPS configuration field itself. For example, in case the value of the SPS configuration field is equal to '000', this may indicate dynamic scheduling or a single transmission (e.g., one TB transmission). Other values may be respectively matched to SPS configuration 0 to SPS configuration 7.

In case of dynamic scheduling, after transmitting one transmission block (TB), sidelink resources that are assigned by the base station are automatically released. Other operations may be the same as the sidelink SPS operations. Which particular value (state) of the SPS configuration field indicates the dynamic scheduling mode and/or the SPS scheduling mode may be signaled or pre-determined by the base station in advance through a higher layer signal (this may be determined in a standard specification).

Figure 16:
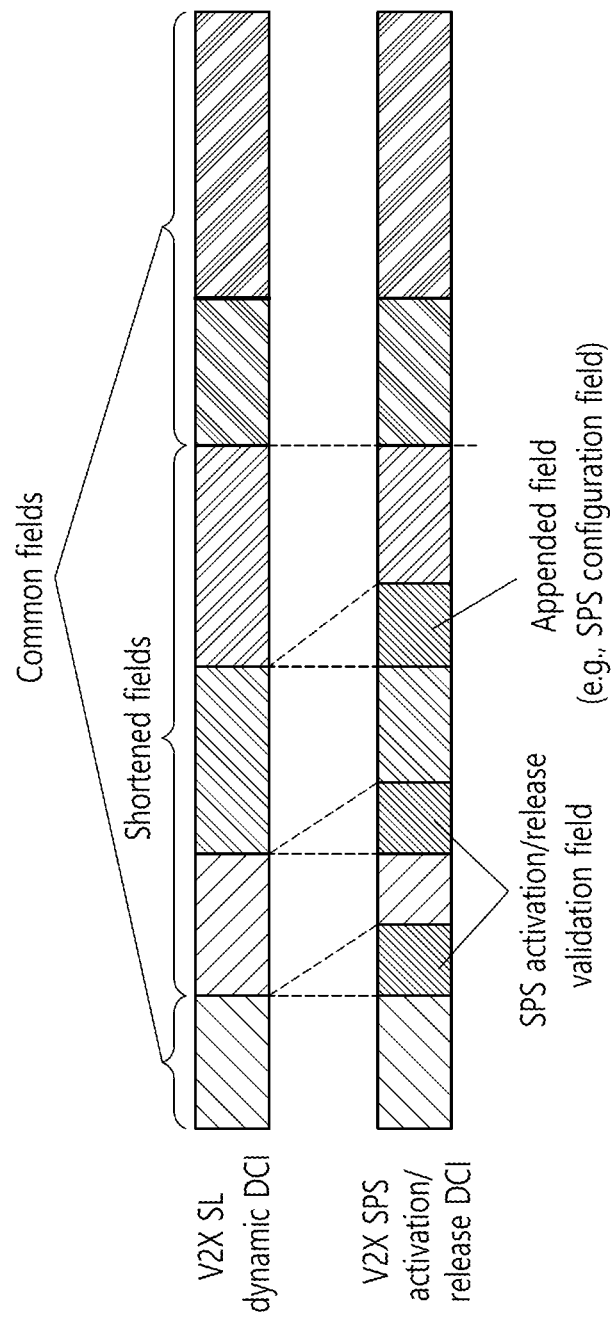
FIG. 16 describes an example of validating a DCI as a DCI format for V2X sidelink SPS activation/release or as a V2X sidelink dynamic DCI.

FIG. 16 describes an example of validating a DCI as a DCI format for V2X sidelink SPS activation/release or as a V2X sidelink dynamic DCI.

A DCI format for V2X sidelink SPS activation/release and a V2X sidelink dynamic DCI may include at least one or more common fields. Additionally, the DCI format for V2X sidelink SPS activation/release may further include a field (e.g., SPS configuration index field) that is not included in the V2X sidelink dynamic DCI.

Among the fields included in the DCI format, in case each of the pre-determined specific fields has a pre-determined value (sequence), the UE may validate the corresponding DCI format as the DCI format for V2X sidelink SPS activation/release.

For example, in case of an SPS release, since an actual SPS data transmission does not occur, values of the DCI fields (MCS, RV, resource block assignment field, and so on) that are related to resource assignment become unneeded (or unnecessary) values. Therefore, the values of the DCI fields that are related to resource assignment may be configured as a pre-determined sequence (e.g., all of the values may be set to 0).

The following table shows a mapping example between a cyclic shift DM-RS field and a V2X uplink SPS configuration index.

TABLE 6

| Value of SPS configuration field of a sidelink (E)PDCCH | Usage |
|---|---|
| '000' | Sidelink dynamic scheduling |
| '001' | Sidelink SPS configuration 0 for V2X |
| '010' | Sidelink SPS configuration 1 for V2X |
| '011' | Sidelink SPS configuration 2 for V2X |
| '100' | Sidelink SPS configuration 3 for V2X |
| '101' | Sidelink SPS configuration 4 for V2X |
| '110' | Sidelink SPS configuration 5 for V2X |
| '111' | Sidelink SPS configuration 6 for V2X |

In order to save DCI fields in DCI Format 5, there may exist some flexibility in the resource assignment for SPS. In order to schedule the indicated sidelink V2V (including the SPS), the bit size of the DCI field may be reduced according to a position correlation between the SA and data. When SPS data are transmitted in accordance with the T-RPT pattern, a T-RPT field, a frequency hopping flag field, and/or an RV field may be used. However, when each SPS (re-)transmission follows the DCI, such DCI fields may not be needed.

If a time gap between a SA transmission and a data transmission is informed in advance or fixed, a time indication field corresponding to the data transmission (a field announcing (or informing) a timing offset between the SA and the data) will not be needed. Additionally, if the SA can announce (or inform) a start position of a frequency assignment of the data, it may suffice to have the resource block assignment field that is included in the DCI to inform only the RB size of the corresponding data. Accordingly, the resource block assignment field may be reduced to 3 to 7 bits.

Similarly, by performing subchannelization of the data region, a larger number of DCI bits may be saved. For example, by dividing (or subchannelizing) the data region to 10 sub-channels, the resource block assignment field may be reduced to 4 bits.

The following table shows an example of changing the fields (DCI fields) being included in the DCI Format 5 for sidelink SPS.

TABLE 7

| DCI field for DCI format 5 for sidelink SPS | when there is no modification | when there is no T-RPT | when there is no T-RPT, and RB assignment field indicates only RB size | when there is no T-RPT and RB assignment field indicates sub channel index (e.g. 10 subchannels) |
|---|---|---|---|---|
| Freq. Hopping Flag | 1 | 1 | 1 | 1 |
| RB assign | 5~13 | 5~13 | 3~7 | 4 |
| TPC | 1 | 1 | 1 | 1 |
| SA resource | 6 | 6 | 6 | 6 |
| T-RPT | 7 | | | |
| SPS configuration | X | 3 | 3 | 3 |
| Total size | 20~28 | 16~24 | 14~18 | 15 |

DCIs including different SP configurations may be associated to a common RNTI, and the corresponding RNTI may be different from the RNTI for dynamic scheduling.

The DCI Format 5 may undergo minor changes and may then be used for a(n) (E)PDCCH for sidelink SPS trigger/release.

The resource block assignment field and the T-RPT field for the DCI Format 5 may be excluded or be reduced in length in accordance with their relation with the time/frequency position between the SA and the data.

In summary, 1) after receiving a(n) (E)PDCCH message for SPS trigger/release, the UE may feed-back an ACK/NACK. 2) DCIs having different SP configurations may be associated to a common RNTI, and, in the point of view of the UE, the corresponding RNTI may be different from the RNTI that is used for dynamic scheduling. 3) The DCI Format 5 may undergo minor changes and may then be used for a(n) (E)PDCCH for sidelink SPS trigger/release. 4) The resource block assignment field and the T-RPT field may be excluded or be reduced in length in accordance with their relation with the time/frequency position between the SA and the data.

Hereinafter, a method for efficiently supporting uplink SPS operations will be described in detail.

As described above, in case of the Mode 1 SPS, the base station may configure a plurality of (multiple) SPS configurations to the UE. A SPS configuration specific MCS and a SPS configuration specific cycle period may be configured. The base station may trigger/release dynamically different SPS configurations by using the PDCCH/EPDCCH. Before a transmission time point that is associated to the SPS configuration, the UE may announce to the base station that the UE will not be performing data transmission.

<(E)PDCCH Design for Uplink SPS>

The uplink SPS and the sidelink SPS are similar in the aspect that they are both related to V2X message transmission and that the resources are configured by the base station. Therefore, it will be preferable that the uplink SPS and the sidelink SPS have a common design.

In the uplink SPS (E)PDCCH design, a DCI for a UL grant (e.g., DCI Format 0) may become the basic DCI. Considering the characteristics of SPS, the uplink SPS (E)PDCCH should differentiate its SPS trigger/release. Additionally, a plurality of SPS configurations should be supported. For this, it may be required to change some (or part) of the fields, among the fields included in the existing DCI format, and then to adopt the new field (SPS configuration index). Herein, the SPS configuration fields may be expressed as indexes of the SPS configuration. For example, the SPS configuration field may be expressed as an index of the SPS configuration. For example, in case 7 SPS configurations exist, the size of an SPS configuration field may be equal to 3 bits.

If the cyclic shift DM RS field is used as an SPS configuration index, each of the remaining values excluding '000' may be matched to SPS configuration 0 to 7. With the exception of the cyclic shift DM RS field, the performance of the V2X uplink SPS trigger/release may be similar to the performance of an LTE uplink SPS.

The following table shows an exemplary mapping between values of a cyclic shift DM RS field and a V2X uplink SPS configuration index.

TABLE 8

| Value of Cyclic shift DM RS field in DCI format 0 | Usage |
|---|---|
| '000' | Existing LTE uplink SPS |
| '001' | Uplink SPS configuration 0 for V2X |
| '010' | Uplink SPS configuration 1 for V2X |
| '011' | Uplink SPS configuration 2 for V2X |
| '100' | Uplink SPS configuration 3 for V2X |
| '101' | Uplink SPS configuration 4 for V2X |
| '110' | Uplink SPS configuration 5 for V2X |
| '111' | Uplink SPS configuration 6 for V2X |

The SPS configuration field may also be expressed as a bitmap (e.g., a bitmap of 8 bits). This case is preferable for synchronized management and operation of a plurality of SPS configurations.

<Processing Collision Between Different SPS Configurations>

In the uplink SPS, how to process a change in a message arrival pattern may be an important issue. Firstly, if a message arrival pattern is changed, the UE may announce (or notify) such change to the base station so that appropriate actions can be taken.

The UE may announce to the base station that the UE will not be transmitting any data before the transmission time point being associated with the SPS configuration. The UE may announce that it will not be transmitting any data during one SPS transmission opportunity, or the UE may announce that it will not be transmitting any data throughout the SPS transmission opportunities, i.e., a relatively long period of time according to the SPS configuration.

In case of the latter, a UE report may be viewed as a type of SPS configuration change/release request. More specifically, in case the message arrival pattern is changed because the UE has not used a particular SPS configuration during a particular period of time, the UE may report this situation to the base station so that the base station can activate another SPS configuration that is appropriate to the changed message arrival pattern. The report may be provided through a higher layer signal in order to prevent an excessive uplink overhead.

In case of the former, a UE report may be viewed as a type of 'verification of a single transmission opportunity'. The base station may know which SPS transmission opportunity is actually being used by the UE.

The verification may correspond to a positive verification or a negative verification. In case the verification corresponds to a positive verification, the corresponding report is transmitted when the UE transmits data, and if there is no positive verification, it may be interpreted that there is not data transmission. In this case, the corresponding resources may be used for other purposes.

In case the verification corresponds to a negative verification, the corresponding report is transmitted when the UE does not transmit any data. Among the two verification methods, it may be preferable to use the positive verification method. This is because the corresponding report may reduce the number of transmission sessions that are carried out for transmitting the report. The positive verification is advantageous in that the number of verification messages that are transmitted is not greater than the actual SPS data transmissions.

Most particularly, in case a plurality of SPS configurations are configured to the UE, this advantage becomes clearer. For example, in order to process a change in the message size, if a negative verification is used, the UE will be required to transmit a negative verification before each of the SPS transmission opportunities that are not being used. Conversely, if the positive verification indicates the SPS configuration that is actually being used, it may be generalized that the positive verification selects a SPS configuration during each data transmission. For example, a PUCCH resource may be assigned to the UE, and an index of the SPS configuration that is to be used during a next data transmission may be included in the PUCCH transmission.

Figure 17:
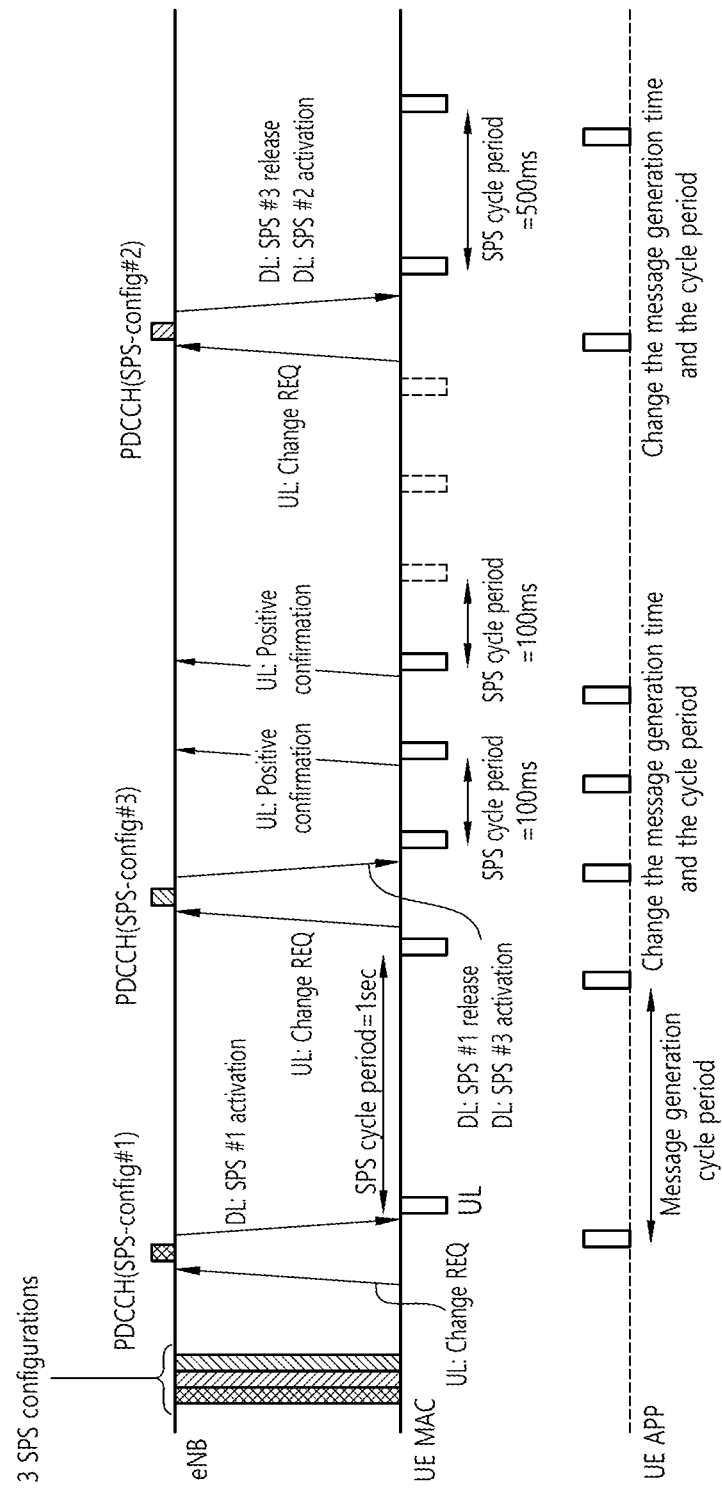
FIG. 17 shows an example where 2 reports are used at the same time.

FIG. 17 shows an example where 2 reports are used at the same time. The UE may configure 3 cycle periods, i.e., 1000, 500, and 100 ms having different SPS configurations. The UE may first be instructed to activate SPS configuration #1. If the message generation cycle period is changed to 100 ms, the UE may report a change request to the base station, and the base station may release the SPS configuration #1. Thereafter, the base station may activate SPS configuration #3. Accordingly, the message generation cycle period may be changed to 500 ms. The UE may have the data that are intended to be transmitted during several SPS transmission opportunities. At this point, although the verification may correspond to a positive verification, the data are not transmitted. When the UE recognizes such situation, the UE may report another change request to the base station, and the base station may then activate SPS configuration #2.

A report that is related to a sidelink transmission may have a lower priority level as compared to other uplink transmissions. For example, if the UE schedules an ACK/NACK transmission or a PUSCH transmission, the verification of the SPS transmission may be dropped.

Since the base station may know when the UE transmits the verification, the base station may prevent the verification from being dropped due to the scheduling. If the transmission of the verification is dropped due to the scheduling of the base station, in order to avoid breaking (or disobeying) the latency requirements, the UE may transmit data during the corresponding SPS transmission opportunity. When the base station becomes informed (or aware) that the verification transmission has been dropped, the base station may not use the corresponding SPS resource for another purpose.

Meanwhile, when performing V2X Mode 1 communication, a method allowing a V2X transmission UE to determine a (V2X data transmission related) MCS value as a UE implementation (or independently) may be supported.

Herein, for example, in case the same DCI format (or DCI format having the same configuration) (e.g., a similar role as the (existing) "DCI Format 5") (this will be referred to as Mode 1_DCI) is used for a V2X Mode 1 communication scheduling that is based on a "dynamic format" and/or a "SPS format", an MCS field may be defined.

For example, if an MCS field value within the Mode 1_DCI that is received from the (serving) base station indicates a pre-configured(/signaled) specific value (or a "reserved state"), a V2X UE may be capable of determining a (V2X data transmission related) MCS value as a UE implementation (or independently) (e.g., if the MCS field value within the Mode 1_DCI indicates another value (other than the above-mentioned value), V2X data transmission may be performed in accordance with the corresponding MCS value).

For example, a field indicating a PSSCH(/PSCCH) DM-RS (sequence) related "cyclic shift (CS) index" value (and/or a sequence generation related seed value (e.g., sequence group number (U), a basic sequence number (V))) within the DCI format that is related to the V2X Mode 1 communication scheduling may be (additionally) defined.

For example, instead of (additionally) defining a Mode 1_CSFD within the DCI format that is related to the V2X Mode 1 communication scheduling, (A) if a PSSCH(/PSCCH) DM-RS (sequence) related "cyclic shift (CS) index" value (and/or a sequence generation related seed value) is received from the (serving) base station via RRC signaling, the V2X transmission UE may be capable of generating a PSSCH(/PSCCH) DM-RS (sequence) in accordance with the corresponding value.

(B) Alternatively, if a PSSCH(/PSCCH) DM-RS (sequence) related "cyclic shift (CS) index" value (and/or a sequence generation related seed value) is not received from the (serving) base station (via RRC signaling), the V2X transmission UE may be capable of determining the PSSCH (/PSCCH) DM-RS (sequence) related "cyclic shift (CS) index" value (and/or a sequence generation related seed value) as a UE implementation (or independently).

For example, a type(/range) of the "cyclic shift (CS) index" value (and/or a sequence generation related seed value) that can be determined as a UE implementation (or independently) may be pre-configured(/signaled).

The PSSCH DM-RS (sequence) related "cyclic shift (CS) index" value (and/or a sequence generation related seed value), which is determined in accordance with the above-described rule, may also be signaled through a (specific) field within the SA (e.g., a role that is similar to the (existing) "SCI Format 0").

For example, a (Mode 1) PSSCH(/PSCCH) DM-RS (sequence) ("cyclic shift (CS) index" value) may be generated (/determined) through a function in which a pre-configured (/signaled) a "SPS format" based V2X Mode 1 communication related RNTI (SPS-RNTI) value (and/or a "dynamic format" based V2X Mode 1 communication related RNTI (DYM-RNTI) value) is defined as an input parameter (e.g., "FLOOR(SPS-RNTI/2) MOD 8" (herein, "FLOOR (X)" and "A MOD B" respectively indicate a function drawing out an integer that is equal to or smaller than X and a function drawing out a remainder value from A divided by B)).

In a case where a V2X UE performing the "SPS format" based V2X Mode 1 communication has received configuration(/signaling) of a (time/frequency) resource so that the corresponding V2X UE can respectively perform (TDM) transmission of the PSCCH and PSSCH over W and Q number of times, (A) if a pre-configured(/signaled) $S^{th}$ (e.g., "S=1") PSCCH transmission is performed and a (pre-defined) SPS release DCI format (this will be referred to as SPS_RELFMT) is received before an interconnected PSSCH transmission (in subframe #N) (and/or if the SPS_RELFMT is received (in subframe #N) while performing a (PSCCH/PSSCH) transmission operation that is related to a (specific) transmission block), (based on an assumption that the SPS resource has been released (after a time point including (or not including) subframe #(N+4)) settings may be made so that the subsequent transmission operations are not performed (through the corresponding SPS resource) (or settings may be made so that only the (specific) transmission block related transmission can be performed(/completed)).

Herein, for example, for the release of the pre-configured (/signaled) (Mode 1) SPS resource and/or the suspension of the (PSCCH/PSSCH) transmission operation that is based on the corresponding (SPS) resource settings may be made so that SP_RELFMT can be received before a pre-configured(/signaled) value (e.g., "4 ms") from (at least) a first PSCCH transmission point that is related to a (specific) transmission block.

In a case where a V2X UE performing the "dynamic format" based V2X Mode 1 communication has received configuration(/signaling) of a (time/frequency) resource within a plurality of subframes for the transmission of the (specific) transmission block, if a DCI format (DYN_RELFMT) indicating the suspension of a (pre-defined) dynamic transmission is received (Subframe #J) while performing the (PSCCH/PSSCH) transmission operation that is related to the (specific) transmission block, (based on an assumption that the dynamic resource is not valid (or effective) (after a time point including (or not including) subframe #(J+4)) settings may be made so that the subsequent transmission operations are not performed (or settings may be made so that only the (specific) transmission block related transmission can be performed(/completed)).

Herein, for example, for the invalidation (release) of the pre-configured(/signaled) (Mode 1) dynamic resource and/or the suspension of the (PSCCH/PSSCH) transmission operation that is based on the corresponding (dynamic) resource settings may be made so that DYN_RELFMT can be received before a pre-configured(/signaled) value (e.g., "4 ms") from (at least) a first PSCCH transmission point that is related to a (specific) transmission block.

For example, in case the V2X UE has received from its (camping) base station(/cell) a configuration(/signaling) instructing the V2X UE to prioritize the GNSS timing(/synchronization) (over the base station timing(/synchronization)) within a specific carrier, if a (other) base station(/cell) is detected within the corresponding (specific) carrier (e.g., this may be understood that the V2X UE is positioned within the coverage of the detected (other) base station(/cell)), and if the corresponding (other) base station(/cell) is sending a configuration(/signaling) instructing the UE to prioritize the base station timing(/synchronization), (if the V2X UE is positioned (at least) within the coverage of the (other) detected base station(/cell)) the V2X UE may prioritize the base station timing(/synchronization).

The V2X UE may also receive configuration(/signaling) from its (camping) base station(/cell) indicating for which base station(/cell) within the specific carrier the base station timing(/synchronization) or the GNSS timing(/synchronization) is to be prioritized.

In case a HARQ-ACK feedback corresponding to a 'sidelink (and/or uplink)-SPS (activation/release) DCI' reception is defined, in case of a 'NACK', the V2X UE may be capable of performing a ((excluded) pool based) Mode 2 (fallback) operation (during a pre-configured(/signaled) period of time)).

In case a plurality of 'sidelink (and/or uplink) SPS processes(/configurations)' are configured(/signaled) (to a specific V2X UE), a(n) (independent) ("open-loop" (and/or "closed-loop" (e.g., "separate TPC accumulation"))) power control may be managed and operated per 'sidelink (and/or uplink) SPS process(/configuration) (set)', through a pre-defined DCI format (e.g., "DCI 3(/3A)" Format) (this will be referred to as V2XSPS_TPCDCI).

A plurality of (TPC) fields (having a pre-configured(/signaled) size) may exist within the (corresponding) V2XSPS_TPCDCI, and an interconnection(/linkage) information between a specific (TPC) field index and a '(specific) sidelink (and/or uplink) SPS process(/configuration)' (and/or a 'cell index in which a (specific) sidelink (and/or uplink) SPS process(/configuration) is configured(/signaled)' and/or a 'V2X UE ID') may be configured through a pre-defined (higher layer(/physical layer)) signaling.

The (corresponding) V2XSPS_TPCDCI may (exclusively) indicate (or instruct) power control information (in a "cross carrier(/cell) scheduling format) corresponding to another cell (e.g., a secondary cell) (other than a primary cell (and/or a cell in which the V2XSPS_TPCDCI is received (e.g., a (primary cell) common search space))).

For the (corresponding) V2XSPS_TPCDCI, (A) a (new) V2XTPC-RNTI value maybe configured(/signaled) and/or (B) the existing (WAN communication related) TPC-PUSCH-RNTI (and/or TPC-PUCCH-RNTI) value may be (shared and) re-used. In case of the latter, a field (e.g., "1 bit") for differentiating the corresponding DCI from the (existing) WAN communication related TPC DCI within the V2XSPS_TPCDCI may be defined. The V2XSPS_TPCDCI related (payload) size may be defined to identically match the size of the (existing) WAN communication related TPC DCI (e.g., "DCI 3(/3A)") (which is transmitted from the same (common(/UE-specific)) search space (SS) region) (for example, when the V2XSPS_TPCDCI related (payload) size is relatively smaller, zero padding (and/or padding with a pre-configured(/signaled) value)) may be performed until the corresponding size becomes equal to the (payload) size of the (existing) WAN communication related TPC DCI).

Configuration(/signaling) may be made so that "separate TPC accumulation" operations can be applied per 'sidelink (and/or uplink) SPS process(/configuration)'. A different (or independent) "open-loop parameter (e.g., 'P_O' and/or 'ALPHA', and so on)" may be configured(/signaled) per 'sidelink (and/or uplink) SPS process(/configuration)' and/or a different (or independent) power control parameter may be configured(/signaled) within a (single) specific 'sidelink (and/or uplink) SPS process(/configuration)' per (V2X message) PPP (and/or V2X message type(/characteristic (e.g., cycle period))), thereby allowing the V2X UE to apply the interconnected power control parameter when performing transmission of the specific (V2X message) PPP (and/or V2X message type(/characteristic (e.g., cycle period))) (within the corresponding 'sidelink (and/or uplink) SPS process(/configuration)').

Herein, for example, the (independent) ("open-loop" (and/or "closed-loop" (e.g., "separate TPC accumulation"))) power control per 'sidelink (and/or uplink) SPS process(/configuration) (set)' may be implemented by designating a "power offset value" within (part (or all of)) the 'sidelink (and/or uplink) SPS process(/configuration) (set)' through a pre-defined (higher layer(/physical layer)) signaling.

As another example, in case a plurality of 'sidelink (and/or uplink) SPS processes(/configurations)' are configured(/signaled), the "open-loop" (and/or "closed-loop" (e.g., "separate TPC accumulation"))) power control operation(/parameter) may be commonly applied(/managed and operated) between the plurality of 'sidelink (and/or uplink) SPS processes(/configurations)'.

Since the examples of the above-described proposed methods may be included as one of the implementation methods of the present invention, it will be apparent that the corresponding examples can be viewed (or considered) as a type of the proposed methods. Additionally, although the above-described proposed methods may be independently implemented, the above-described proposed methods may also be implemented in a combined (or integrated) form of parts of the proposed methods. For example, although the present invention is described based on a 3GPP LTE/LTE-A system for simplicity in the description, the scope of systems in which the proposed methods can be applied may be extended to diverse systems other than the 3GPP LTE/LTE-A system. For example, the proposed methods according to the present invention may also be extendedly applied to D2D communication. Herein, for example, D2D communication refers to performing communication between a UE and another UE by using a direct wireless channel. And, herein, for example, although the UE refers to a user device, in case a network equipment, such as a base station, transmits/receives signals according to a communication method performed between UEs, the corresponding network equipment may also be viewed as a type of UE. Additionally, for example, the proposed methods according to the present invention may also be limitedly applied only in Mode 2 V2X operations (and/or Mode 1 V2X operations).

Additionally, for example, in the proposed methods according to the present invention, the '(sidelink and/or uplink-SPS) (activation/release) DCI' may be limitedly transmitted only through a '(PDCCH or EPDCCH) UE-specific search space' (or 'PDCCH common search space').

Additionally, for example, in the proposed methods according to the present invention, the '(sidelink and/or uplink-SPS) (activation/release) DCI' may also be interpreted as a 'Mode 1 DCI' (that is received from base station) (announcing PC5 (V2V) SPS related scheduling information).

Figure 18:
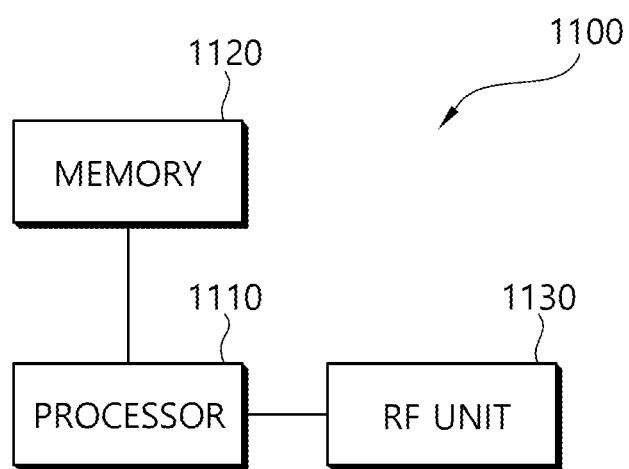
FIG. 18 is a block diagram illustrating a UE in which the embodiments of the present invention are implemented.

FIG. 18 is a block diagram illustrating a UE in which the embodiments of the present invention are implemented.

Referring to FIG. 18, a UE 1100 includes a processor 1110, a memory 1120 and a radio frequency (RF) unit 1130. The processor 1110 implements the proposed functions, processes and/or methods.

The RF unit 1130 is connected to the processor 1110 to transmit and receive radio signals.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for operating a user equipment (UE) according to uplink semi-persistent scheduling (SPS) in a wireless communication system, the method comprising:
receiving, from a base station, downlink control information (DCI) instructing activation or release of the uplink SPS;
based on the DCI being a first DCI for an SPS to transmit a signal to the base station:
decoding the first DCI based on a first radio network temporary identifier (RNTI), wherein the first DCI comprises a bit field that informs a cyclic shift value for a demodulation-reference signal (DM-RS); and
based on the DCI being a second DCI for an SPS to transmit a vehicle-to-everything (V2X) signal: decoding the second DCI based on a second RNTI, wherein the second DCI uses the bit field to inform an index of an uplink SPS configuration,
wherein the first RNTI and the second RNTI are different RNTIs.

2. The method of claim 1, wherein the UE is installed in a vehicle.

3. The method of claim 1, wherein the DCI is received through a physical downlink control channel (PDCCH) or an enhanced PDCCH (EPDCCH).

4. The method of claim 1, wherein the first DCI and the second DCI have a same bit size.

5. The method of claim 1, wherein the first RNTI is an SPS cell-RNTI (C-RNTI), and
wherein the second RNTI is an SPS V2X-RNTI (V-RNTI) for scheduling V2X sidelink communication.

6. A user equipment (UE) configured to operate according to uplink semi-persistent scheduling (SPS) in a wireless communication system, the UE comprising:
a transceiver;
at least one processor; and
at least one computer memory operably connectable to the at least one processor and storing instructions that, when executed by the at least one processor, perform operations comprising:
receiving, from a base station through the transceiver, downlink control information (DCI) instructing activation or release of the uplink SPS;
based on the DCI being a first DCI for an SPS to transmit a signal to the base station:
decoding the first DCI based on a first radio network temporary identifier (RNTI), wherein the first DCI comprises a bit field that informs a cyclic shift value for a demodulation-reference signal (DM-RS); and
based on the DCI being a second DCI for an SPS to transmit a vehicle-to-everything (V2X) signal: decoding the second DCI based on a second RNTI, wherein the second DCI uses the bit field to inform an index of an uplink SPS configuration,
wherein the first RNTI and the second RNTI are different RNTIs.

7. The user equipment of claim 6, wherein the UE is configured to be installed in a vehicle.

8. The user equipment of claim 6, wherein the DCI is received through a physical downlink control channel (PDCCH) or an enhanced PDCCH (EPDCCH).

9. The user equipment of claim 6, wherein the first DCI and the second DCI have a same bit size.

10. The user equipment of claim 6, wherein the first RNTI is an SPS cell-RNTI (C-RNTI), and
wherein the second RNTI is an SPS V2X-RNTI (V-RNTI) for scheduling V2X sidelink communication.

11. A processing apparatus configured to control a user equipment (UE) to operate according to uplink semi-persistent scheduling (SPS) in a wireless communication system, the processing apparatus comprising:
at least one processor; and
at least one computer memory operably connectable to the at least one processor and storing instructions that, when executed by the at least one processor, perform operations comprising:
receiving, from a base station, downlink control information (DCI) instructing activation or release of the uplink SPS;
based on the DCI being a first DCI for an SPS to transmit a signal to the base station:
decoding the first DCI based on a first radio network temporary identifier (RNTI), wherein the first DCI comprises a bit field that informs a cyclic shift value for a demodulation-reference signal (DM-RS); and
based on the DCI being a second DCI for an SPS to transmit a vehicle-to-everything (V2X) signal: decoding the second DCI based on a second RNTI, wherein the second DCI uses the bit field to inform an index of an uplink SPS configuration, wherein the first RNTI and the second RNTI are different RNTIs.

12. The processing apparatus of claim 11, wherein the UE is configured to be installed in a vehicle.

13. The processing apparatus of claim 11, wherein the DCI is received through a physical downlink control channel (PDCCH) or an enhanced PDCCH (EPDCCH).

14. The processing apparatus of claim 11, wherein the first DCI and the second DCI have a same bit size.

15. The processing apparatus of claim 11, wherein the first RNTI is an SPS cell-RNTI (C-RNTI), and wherein the second RNTI is an SPS V2X-RNTI (V-RNTI) for scheduling V2X sidelink communication.

* * * * *

UNITED STATES PATENT AND TRADEMARK OFFICE
CERTIFICATE OF CORRECTION

PATENT NO. : 10,779,295 B2  
APPLICATION NO. : 16/090547  
DATED : September 15, 2020  
INVENTOR(S) : Seungmin Lee et al.

Page 1 of 1

It is certified that error appears in the above-identified patent and that said Letters Patent is hereby corrected as shown below:

On the Title Page

In Item (54), and in the Specification, Column 1, Line 2, after "ACCORDANCE" delete "TO" and insert -- WITH --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*